(12) United States Patent
Fowe

(10) Patent No.: US 11,035,686 B2
(45) Date of Patent: Jun. 15, 2021

(54) USE OF GEOGRAPHIC DATABASE COMPRISING LANE LEVEL INFORMATION FOR TRAFFIC PARAMETER PREDICTION

(71) Applicant: HERE Global B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 131 days.

(21) Appl. No.: 16/119,510

(22) Filed: Aug. 31, 2018

(65) Prior Publication Data
US 2020/0072631 A1 Mar. 5, 2020

(51) Int. Cl.
| | | |
|---|---|---|
| G01C 21/34 | (2006.01) | |
| G08G 1/09 | (2006.01) | |
| G01C 21/30 | (2006.01) | |
| G01C 21/36 | (2006.01) | |
| G06F 16/29 | (2019.01) | |

(52) U.S. Cl.
CPC ..... *G01C 21/3492* (2013.01); *G01C 21/3658* (2013.01); *G01C 21/3691* (2013.01); *G06F 16/29* (2019.01)

(58) Field of Classification Search
CPC ........ G01C 21/34; G01C 21/36; G01C 21/30; G05D 1/00; G08G 1/09; B60W 30/165; G06K 9/00; B60K 31/00
See application file for complete search history.

(56) References Cited

U.S. PATENT DOCUMENTS

| | | |
|---|---|---|
| 6,236,933 B1 | 5/2001 | Lang |
| 7,499,949 B2 | 3/2009 | Barton |
| 8,775,061 B2 * | 7/2014 | Sato ........................ G08G 1/167 701/118 |
| 9,558,657 B2 | 1/2017 | Fowe et al. |
| 9,640,071 B2 | 5/2017 | Fowe et al. |

(Continued)

FOREIGN PATENT DOCUMENTS

| | | | |
|---|---|---|---|
| JP | 2017045130 A * | 3/2017 | ............... G08G 1/09 |
| WO | WO 2012/089281 A1 | 7/2012 | |

OTHER PUBLICATIONS

Xiao, Xiao, et al., "Estimation of Missing Flow at Junctions Using Control Plan and Floating Car Data", Transportation Research Procedia, 2015, pp. 113-123, vol. 10, retrieved from <https://ac.els-cdn.com/S2352146515002483/1-s2.0-S2352146515002483-main.pdf?_tid=00020dfe-dde6-4f6f-ba24-cb69fec050bc&acdnat=1524414279_7c4ac780785a9bbec1abf3ce35f86a8e> on Feb. 12, 2019.

*Primary Examiner* — Yuri Kan
(74) *Attorney, Agent, or Firm* — Alston & Bird LLP

(57) ABSTRACT

A plurality of sequences of instances of probe data are received. Each sequence corresponds to travel of a vehicle apparatus along a first segment to one of two or more possible subsequent second segments and comprises an indication of at least one parameter characterizing the travel of the vehicle apparatus along the first segment. Groups of sequences are determined. Each group corresponds to a subsequent second segment. For a first group, at least one representative parameter is determined based on the at least one parameter of the sequences of the first group. An element of a data structure is modified and/or updated with the at least one representative parameter. The element of the data structure corresponds to the first group. A geographic database comprises the data structure and a navigation application is configured to use at least a portion of the data structure to perform a navigation function.

20 Claims, 8 Drawing Sheets

(56) References Cited

U.S. PATENT DOCUMENTS

| | | | |
|---|---|---|---|
| 9,672,734 B1 | 6/2017 | Ratnasingam | |
| 9,851,205 B2 | 12/2017 | Fowe | |
| 9,958,284 B2 | 5/2018 | Fino | |
| 10,538,244 B2* | 1/2020 | Niino | B60W 30/18163 |
| 2005/0267651 A1* | 12/2005 | Arango | G08G 1/096811 |
| | | | 701/3 |
| 2006/0155427 A1* | 7/2006 | Yang | G08G 1/07 |
| | | | 701/1 |
| 2007/0299602 A1 | 12/2007 | Auxer et al. | |
| 2008/0303693 A1 | 12/2008 | Link, II | |
| 2010/0246889 A1* | 9/2010 | Nara | G06K 9/00798 |
| | | | 382/104 |
| 2012/0226434 A1 | 9/2012 | Chiu et al. | |
| 2014/0114556 A1 | 4/2014 | Pan et al. | |
| 2014/0278052 A1 | 9/2014 | Slavin et al. | |
| 2015/0253144 A1 | 9/2015 | Rau et al. | |
| 2017/0076595 A1 | 3/2017 | Macfarlane et al. | |
| 2018/0051993 A1* | 2/2018 | Wagner | G08G 1/056 |
| 2018/0174443 A1 | 6/2018 | Fowe et al. | |
| 2018/0274937 A1* | 9/2018 | Wolfe | G08G 1/096838 |
| 2019/0114909 A1 | 4/2019 | Halama et al. | |
| 2019/0228661 A1 | 7/2019 | Wiesner et al. | |
| 2019/0241184 A1* | 8/2019 | Hayashi | G05D 1/0223 |
| 2020/0064139 A1 | 2/2020 | Mieth et al. | |
| 2020/0073966 A1* | 3/2020 | Fowe | G01C 21/3691 |

* cited by examiner

| EPOCH | SEGMENT ID | SEGMENT LENGTH | SECOND SEGMENT ID | MEAN SPEED | STANDARD DEVIATION | MEDIAN SPEED | PROBE COUNT |
|---|---|---|---|---|---|---|---|
| <TIMESTAMP> | <STRING> | <FLOAT> | <STRING> | <FLOAT> | <FLOAT> | <FLOAT> | <INTEGER> |

FIG. 7

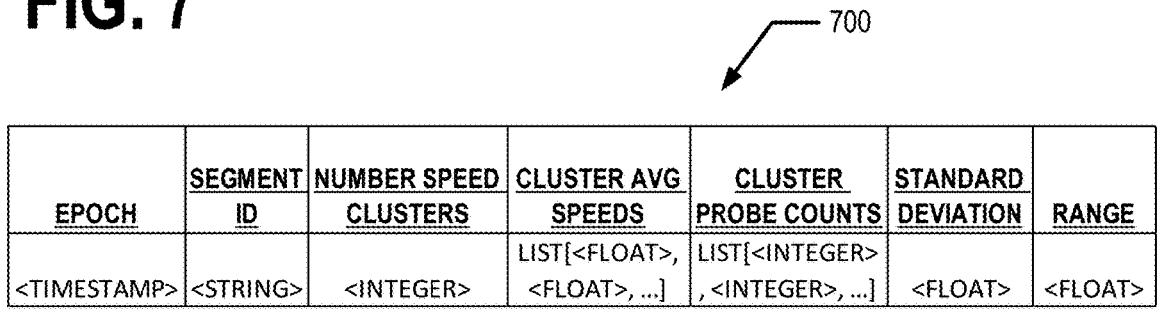

| EPOCH | SEGMENT ID | NUMBER SPEED CLUSTERS | CLUSTER AVG SPEEDS | CLUSTER PROBE COUNTS | STANDARD DEVIATION | RANGE |
|---|---|---|---|---|---|---|
| <TIMESTAMP> | <STRING> | <INTEGER> | LIST[<FLOAT>, <FLOAT>, ...] | LIST[<INTEGER>, <INTEGER>, ...] | <FLOAT> | <FLOAT> |

FIG. 8

```
[1]  V ← {A LIST OF EACH PROBE'S P VALUES}
[2]  FUNCTION MDC(V):
[3]      S ← STD(V)
[4]      M ← MEAN(V)
[5]      V ← V ∀ V < M + 2S & V > M - 2S  //FILTER OUTLIERS
[6]      D ← RANGE(V)/BIN_NUMBER
[7]      FOR I ← 1 TO BIN_NUMBER  //BUCKETIZE
[8]          B_I ← {V ∀ V < MAX(V) & V > (MAX(V) - I*D)}
[9]          V ← V - B_I
[10]     END FOR
[11]     V ← B_1 + B_2 + ... + B_BIN_NUMBER  //RESTORE V
[12]     C ← 1
[13]     FOR I ← 2 TO BIN_NUMBER  //CLUSTER SEARCH
[14]         MG ← (MEAN(B_1) - MEAN(B_I)) / RANGE(V)
[15]         IF |B_1| > N_1 AND MG > T AND |V - B_1| > N_2
[16]         THEN {
[17]             MD ← {C, MEAN(B_1), SIZE(B_1), STD(B_1), MG}
[18]             C ← C + 1
[19]             V ← V - B_1
[20]             B_1 ← B_I
[21]         }
[22]         ELSE B_1 ← B_1 + B_I
[23]         END IF
[24]     END FOR
[25]     MD ← {C, MEAN(B_1), SIZE(B_1), STD(B_1)}
[26]     RETURN MD
[27] END MDC
```

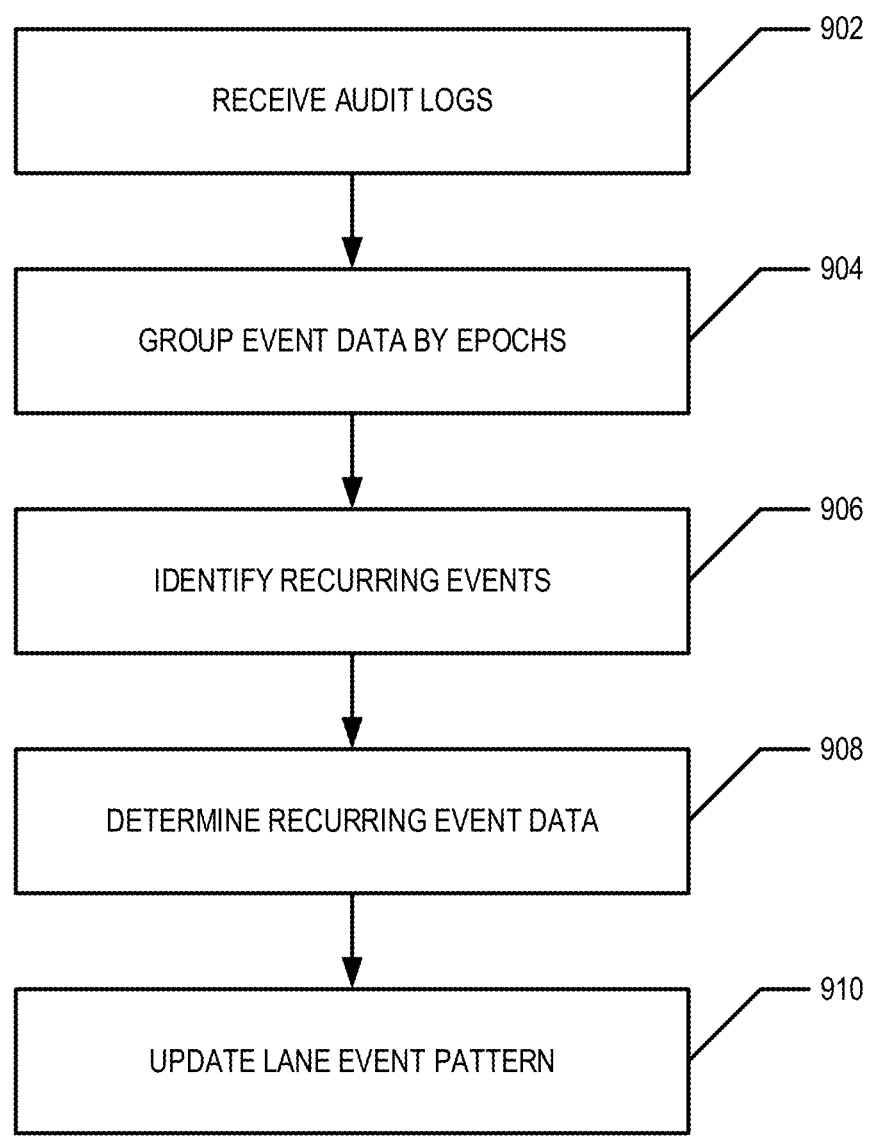

USE OF GEOGRAPHIC DATABASE COMPRISING LANE LEVEL INFORMATION FOR TRAFFIC PARAMETER PREDICTION

TECHNOLOGICAL FIELD

An example embodiment relates generally to lane-level traffic patterns. An example embodiment relates generally to generating and providing lane-level traffic pattern information/data as part of a geographic database for use in performing navigation functions.

BACKGROUND

Autonomous, self-driving vehicle and advanced driver assistances system (ADAS), among other factors, have increased the need for digital maps that provide lane-level detail of a road network. However, to gain the full benefit of a lane-level digital map, lane-level traffic information/data should be able to be determined under a variety of circumstances. For example, if a network connection is not available and/or the bandwidth available to a navigation system is too small/confined, the navigation system may not be able to receive current lane-level traffic information/data.

BRIEF SUMMARY OF SOME EXAMPLE EMBODIMENTS

Various embodiments provide methods, systems, apparatuses, and computer program products for determining and/or generating lane direction patterns, divergent parameter patterns, and/or lane event patterns for one or more road segments of a road network; incorporating the lane direction patterns, divergent parameter patterns, and/or lane event patterns into a digital map and/or geographic database; and providing the digital map and/or geographic database to a vehicle apparatus (e.g., onboard and/or coupled to a vehicle) such that the lane direction patterns, divergent parameter patterns, and/or lane event patterns may be used (e.g., by a navigation application operating on the vehicle apparatus and/or network apparatus) to perform one or more navigation functions. In various embodiments, the lane direction patterns, divergent parameter patterns, and/or lane event patterns may be used (e.g., by the vehicle apparatus) to predict lane-level traffic conditions, lane-level traffic information/data, lane-level travel times, and/or the like. In various embodiments, the prediction(s) may be performed to determine a future lane-level traffic conditions, lane-level traffic information/data, lane-level travel times, and/or the like; estimate a current lane-level traffic conditions, lane-level traffic information/data, lane-level travel times, and/or the like when real-time information/data is not available due to lack of network connection/bandwidth and/or an insufficient number of probe apparatuses reporting real-time information/data for the subject road segments.

In various embodiments, a lane direction pattern is an information/data artifact, data structure, and/or object that indicates a representative parameter corresponding to a flow of traffic on a first segment for vehicles that travel the first segment to a subsequent second segment. For example, if the first segment ends at a four way intersection (e.g., a vehicle can turn right, turn left, or continue forward), the lane direction pattern may indicate three representative parameters corresponding to the flow of traffic on the first segment with each of the representative parameters corresponding to one of the second segments available for a vehicle to travel immediately after traveling the first segment. In various embodiments, the representative parameters corresponding to the flow of traffic on the first segment are determined based on probe information/data captured by vehicle apparatuses as the vehicle apparatuses traversed the first segment. In an example embodiment, the representative parameters corresponding to the flow of traffic on the first segment correspond to an epoch. In an example embodiment, an epoch is a particular period of time. For example, a week or other period of time (e.g., month, day, and/or the like) may be divided into predefined time windows. For example, a week or other period of time may be divided into a plurality of time windows that are each 10 minutes, 15 minutes, 20 minutes, 30 minutes, and/or the like long. In an example embodiment, the representative parameters comprise a travel speed corresponding to the speed of vehicles at a particular point along the first segment, an average travel speed along at least a portion of the first segment, and/or other travel speed corresponding to the first segment. In an example embodiment, the representative parameters comprise a travel speed to free flow speed ratio, a travel time for traversing the first segment, and/or the like. In an example embodiment, the representative parameter may be an average parameter (e.g., mean, median, or mode).

In various embodiments, a divergent parameter pattern is an information/data artifact, data structure, and/or object that indicates a representative parameter corresponding to a cluster of traffic traversing a first segment. For example, the divergent parameter pattern may provide representative parameters for first segments where traffic in one or more of the lanes of the first segment travels at a different speed than traffic in one or more other lanes. For example, the divergent parameter pattern comprises a representative parameter corresponding to a cluster of traffic traversing a first segment for first segments where the distribution of parameters corresponding to traffic traversing the first segment is multimodal. In an example embodiment, the representative parameters corresponding to the flow of traffic on the first segment corresponding to an epoch. In an example embodiment, the divergent parameter pattern only includes representative parameters for first segments having multimodal parameter distributions and/or only for epochs when the multimodal parameter distribution is observed. In various embodiments, the representative parameters and the distribution of parameters are determined based on probe information/data captured by vehicle apparatuses as they traverse the first segment. In an example embodiment, the representative parameters comprise a travel speed corresponding to the speed of vehicles at a particular point along the first segment, an average travel speed along at least a portion of the first segment, and/or other travel speed corresponding to the first segment. In an example embodiment, the representative parameters comprise a travel speed to free flow speed ratio, a travel time for traversing the first segment, and/or the like. In an example embodiment, the representative parameter may be an average parameter (e.g., mean, median, or mode).

In various embodiments, a lane event pattern is an information/data artifact, data structure, and/or object that provides information regarding lane-level traffic events. In an example embodiment, a lane event pattern is generated by reviewing and/or analyzing the audit logs generated by real-time processing of probe information/data by one or more lane-level real-time traffic engines.

In an example embodiment, a plurality of sequences of instances of probe data are received. Each sequence (a) corresponds to travel of a vehicle apparatus along a first segment to one of two or more possible subsequent second segments and (b) comprises an indication of at least one parameter characterizing the travel of the vehicle apparatus along the first segment. Two or more groups of sequences from the plurality of sequences determined. Each group corresponds to one of the two or more possible subsequent second segments. For a first group of the two or more groups, at least one representative parameter is determined based on the at least one parameter of the one or more sequences of the first group. At least one element of a data structure is modified and/or updated with the at least one representative parameter. The at least one element of the data structure corresponds to the first group. A geographic database comprises the data structure and a navigation application is configured to use at least a portion of the geographic database that comprises the data structure to perform a navigation function.

In accordance with an aspect of the present invention, a method for providing a lane direction pattern for use in completing one or more navigation functions (e.g., lane level navigation functions) is provided. In an example embodiment, the method comprises receiving, by a network apparatus comprising a processor, memory, and a communication interface configured to communicate via at least one network, a plurality of sequences of instances of probe data. Each sequence (a) corresponds to travel of a vehicle apparatus along a first segment to one of two or more possible subsequent second segments and (b) comprises an indication of at least one parameter characterizing the travel of the vehicle apparatus along the first segment. The method further comprises generating, by the network apparatus, two or more groups of sequences from the plurality of sequences. Each group corresponds to one of the two or more possible subsequent second segments. In an example embodiment, the method further comprises, for a first group of the two or more groups, determining, by the network apparatus, at least one representative parameter based on the at least one parameter of the one or more sequences of the first group. In an example embodiment, the method further comprises modifying, by the network apparatus, at least one element of a data structure with the at least one representative parameter. The at least one element of the data structure corresponds to the first group. A geographic database comprises the data structure and a navigation application is configured to use at least a portion of the geographic database that comprises the data structure to perform a navigation function.

In an example embodiment, the at least one parameter comprises a speed of travel of the vehicle apparatus along at least a portion of the first segment. In an example embodiment, the representative at least one parameter comprises at least one of (a) a mean of the at least one parameter for the sequences of the first group, (b) a median of the at least one parameter for the sequences of the first group, or (c) a standard deviation of the at least one parameter for the sequences of the first group. In an example embodiment, (a) each sequence is associated with a timestamp and (b) each group of the two or more groups corresponds to both (i) a particular second segment of the two or more possible subsequent second segments and (ii) a predefined epoch. In an example embodiment, the predefined epoch corresponds to a predefined time window of a week. In an example embodiment, the predefined time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, the method further comprises determining a number of sequences in the first group; and modifying at least one second element of the data structure with the number of sequences in the first group, the at least one second element corresponding to the first group and the first segment. In an example embodiment, performing the navigation function comprises using at least a portion of the data structure to predict a traffic parameter corresponding to the first segment.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least receive a plurality of sequences of instances of probe data. Each sequence (a) corresponds to travel of a vehicle apparatus along a first segment to one of two or more possible subsequent second segments and (b) comprises an indication of at least one parameter characterizing the travel of the vehicle apparatus along the first segment. The computer program code is further configured to, when executed by the at least one processor, cause the apparatus to at least generate two or more groups of sequences from the plurality of sequences. Each group corresponds to one of the two or more possible subsequent second segments. The computer program code is further configured to, when executed by the at least one processor, cause the apparatus to at least, for a first group of the two or more groups, determine at least one representative parameter based on the at least one parameter of the one or more sequences of the first group. The computer program code is further configured to, when executed by the at least one processor, cause the apparatus to at least modify at least one element of a data structure with the at least one representative parameter. The at least one element of the data structure corresponding to the first group. A geographic database comprises the data structure and a navigation application is configured to use at least a portion of the geographic database that comprises the data structure to perform a navigation function.

In an example embodiment, the at least one parameter comprises a speed of travel of the vehicle apparatus along at least a portion of the first segment. In an example embodiment, the representative at least one parameter comprises at least one of (a) a mean of the at least one parameter for the sequences of the first group, (b) a median of the at least one parameter for the sequences of the first group, or (c) a standard deviation of the at least one parameter for the sequences of the first group. In an example embodiment, (a) each sequence is associated with a timestamp and (b) each group of the two or more groups corresponds to both (i) a particular second segment of the two or more possible subsequent second segments and (ii) a predefined epoch. In an example embodiment, the predefined epoch corresponds to a predefined time window of a week. In an example embodiment, the predefined time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, the computer program code is further configured to, when executed by the at least one processor, cause the apparatus to at least determine a number of sequences in the first group; and modify at least one second element of the data structure with the number of sequences in the first group, the at least one second element corresponding to the first group and the first segment. In an example embodiment, performing the navigation function comprises using at least a portion of the data structure to predict a traffic parameter corresponding to the first segment.

According to still another aspect of the present invention, a computer program product is provided. In an example embodiment, the computer program product comprises at least one non-transitory computer-readable storage medium having computer-executable program code instructions stored therein. The computer-executable program code instructions comprise program code instructions configured to, when executed by a processor of an apparatus, cause the apparatus to at least receive a plurality of sequences of instances of probe data. Each sequence (a) corresponds to travel of a vehicle apparatus along a first segment to one of two or more possible subsequent second segments and (b) comprises an indication of at least one parameter characterizing the travel of the vehicle apparatus along the first segment. The computer-executable program code instructions further comprise program code instructions configured to, when executed by a processor of an apparatus, cause the apparatus to at least generate two or more groups of sequences from the plurality of sequences. Each group corresponds to one of the two or more possible subsequent second segments. The computer-executable program code instructions further comprise program code instructions configured to, when executed by a processor of an apparatus, cause the apparatus to at least, for a first group of the two or more groups, determine at least one representative parameter based on the at least one parameter of the one or more sequences of the first group. The computer-executable program code instructions further comprise program code instructions configured to, when executed by a processor of an apparatus, cause the apparatus to at least modify at least one element of a data structure with the at least one representative parameter. The at least one element of the data structure corresponding to the first group. A geographic database comprises the data structure and a navigation application is configured to use at least a portion of the geographic database that comprises the data structure to perform a navigation function.

In an example embodiment, the at least one parameter comprises a speed of travel of the vehicle apparatus along at least a portion of the first segment. In an example embodiment, the representative at least one parameter comprises at least one of (a) a mean of the at least one parameter for the sequences of the first group, (b) a median of the at least one parameter for the sequences of the first group, or (c) a standard deviation of the at least one parameter for the sequences of the first group. In an example embodiment, (a) each sequence is associated with a timestamp and (b) each group of the two or more groups corresponds to both (i) a particular second segment of the two or more possible subsequent second segments and (ii) a predefined epoch. In an example embodiment, the predefined epoch corresponds to a predefined time window of a week. In an example embodiment, the predefined time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, the computer-executable program code instructions further comprise program code instructions configured to, when executed by a processor of an apparatus, cause the apparatus to at least determine a number of sequences in the first group; and modify at least one second element of the data structure with the number of sequences in the first group, the at least one second element corresponding to the first group and the first segment. In an example embodiment, performing the navigation function comprises using at least a portion of the data structure to predict a traffic parameter corresponding to the first segment.

In accordance yet another aspect of the present invention, an apparatus is provided. In an example embodiment, the apparatus comprises means for receiving a plurality of sequences of instances of probe data. Each sequence (a) corresponds to travel of a vehicle apparatus along a first segment to one of two or more possible subsequent second segments and (b) comprises an indication of at least one parameter characterizing the travel of the vehicle apparatus along the first segment. In an example embodiment, the apparatus comprises means for generating two or more groups of sequences from the plurality of sequences. Each group corresponds to one of the two or more possible subsequent second segments. In an example embodiment, the apparatus comprises means for, for a first group of the two or more groups, determining, by the network apparatus, at least one representative parameter based on the at least one parameter of the one or more sequences of the first group. In an example embodiment, the apparatus comprises means for modifying at least one element of a data structure with the at least one representative parameter. The at least one element of the data structure corresponds to the first group. A geographic database comprises the data structure and a navigation application is configured to use at least a portion of the geographic database that comprises the data structure to perform a navigation function.

In an example embodiment, a plurality of instances of probe data are received. Each instance of probe data (a) corresponds to travel of a vehicle apparatus along a first segment, (b) comprises an indication of at least one parameter characterizing the travel of the vehicle apparatus along the first segment, and (c) comprises a timestamp. A plurality of groups of instances of probe data are determined from the plurality of instance of probe data. A first group of the plurality of groups corresponds to a first predefined epoch. An instance of probe data is assigned to the first group of the plurality of groups based on the timestamp of the instance of probe data corresponding to a time within the first predefined epoch. The at least one parameter is extracted from each of the instances of probe data assigned to the first group to generate a distribution of parameters. One or more clusters of instances of probe data of the first group are identified based on the distribution parameters. Responsive to identifying two or more clusters of instances of probe data of the first group a representative at least one parameter is determined for each cluster of the two or more clusters, and at least one element of a data structure is modified based on the representative at least one parameter for each cluster of the two or more clusters, the at least one element corresponding to the first segment and the first predefined epoch. Responsive to identifying only one cluster of instances of probe data in the first group, the data structure is not modified based on the instances of probe data of the first group. A geographic database comprises the data structure and a navigation application is configured to use at least a portion of the geographic database that comprises the data structure to perform a navigation function.

In accordance with an aspect of the present invention, a method for providing a divergent parameter pattern for use in completing one or more navigation functions (e.g., lane level navigation functions) is provided. In an example embodiment, the method comprises receiving, by a network apparatus comprising a processor, memory, and a communication interface configured to communicate via at least one network, a plurality of instances of probe data. Each instance of probe data (a) corresponds to travel of a vehicle apparatus along a first segment, (b) comprises an indication of at least one parameter characterizing the travel of the vehicle apparatus along the first segment, and (c) comprises a timestamp. The method further comprises generating, by the network apparatus, a plurality of groups of instances of probe data from the plurality of instance of probe data. A first group of the plurality of groups corresponds to a first predefined epoch. An instance of probe data is assigned to the first group of the plurality of groups based on the timestamp of the instance of probe data corresponding to a time within the first predefined epoch. In an example embodiment, the method further comprises extracting, by the network apparatus, the at least one parameter from each of the instances of probe data assigned to the first group to generate a distribution of parameters. In an example embodiment, the method further comprises identifying, by the network apparatus, one or more clusters of instances of probe data of the first group based on the distribution parameters. In an example embodiment, the method further comprises, responsive to identifying two or more clusters of instances of probe data of the first group determining, by the network apparatus, a representative at least one parameter for each cluster of the two or more clusters, and modifying, by the network apparatus, at least one element of a data structure based on the representative at least one parameter for each cluster of the two or more clusters. The at least one element corresponding to the first segment and the first predefined epoch. In an example embodiment, the method further comprises, responsive to identifying only one cluster of instances of probe data in the first group, not modifying the data structure based on the instances of probe data of the first group. A geographic database comprises the data structure and a navigation application is configured to use at least a portion of the geographic database that comprises the data structure to perform a navigation function.

In an example embodiment, (a) the at least one parameter comprises a speed of travel of the vehicle apparatus along at least a portion of the first segment, (b) the one or more clusters correspond to clusters of travel speed, and (c) the representative at least one parameter for each cluster comprises a representative travel speed for the corresponding cluster. In an example embodiment, the representative at least one parameter for each cluster comprises at least one of (a) a mean of the at least one parameter for the instances of probe data of the corresponding cluster, (b) a median of the at least one parameter for the instances of probe data of the corresponding cluster, or (c) a standard deviation of the at least one parameter for the instances of probe data of the corresponding cluster. In an example embodiment, the first predefined epoch corresponds to a particular time window of a week. In an example embodiment, the particular time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, the method further comprises determining a number of unique vehicle identifiers in the first group for each cluster; and modifying at least one second element of the data structure with the number of unique vehicle identifiers in the first group for each cluster, the at least one second element corresponding to the first group and the first segment. In an example embodiment, performing the navigation function comprises using at least a portion of the data structure to predict a traffic parameter corresponding to the first segment. In an example embodiment, two or more clusters are identified when the distribution of parameters is multimodal.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least receive a plurality of instances of probe data. Each instance of probe data (a) corresponds to travel of a vehicle apparatus along a first segment, (b) comprises an indication of at least one parameter characterizing the travel of the vehicle apparatus along the first segment, and (c) comprises a timestamp. The computer program code is further configured to, when executed by the at least one processor, cause the apparatus to at least generate a plurality of groups of instances of probe data from the plurality of instance of probe data. A first group of the plurality of groups corresponds to a first predefined epoch and an instance of probe data is assigned to the first group of the plurality of groups based on the timestamp of the instance of probe data corresponding to a time within the first predefined epoch. The computer program code is further configured to, when executed by the at least one processor, cause the apparatus to at least extract the at least one parameter from each of the instances of probe data assigned to the first group to generate a distribution of parameters; and identify one or more clusters of instances of probe data of the first group based on the distribution parameters. The computer program code is further configured to, when executed by the at least one processor, cause the apparatus to at least responsive to identifying two or more clusters of instances of probe data of the first group determine a representative at least one parameter for each cluster of the two or more clusters, and modify at least one element of a data structure based on the representative at least one parameter for each cluster of the two or more clusters. The at least one element corresponding to the first segment and the first predefined epoch. The computer program code is further configured to, when executed by the at least one processor, cause the apparatus to at least, responsive to identifying only one cluster of instances of probe data in the first group, not modify the data structure based on the instances of probe data of the first group. A geographic database comprises the data structure and a navigation application is configured to use at least a portion of the geographic database that comprises the data structure to perform a navigation function.

In an example embodiment, (a) the at least one parameter comprises a speed of travel of the vehicle apparatus along at least a portion of the first segment, (b) the one or more clusters correspond to clusters of travel speed, and (c) the representative at least one parameter for each cluster comprises a representative travel speed for the corresponding cluster. In an example embodiment, the representative at least one parameter for each cluster comprises at least one of (a) a mean of the at least one parameter for the instances of probe data of the corresponding cluster, (b) a median of the at least one parameter for the instances of probe data of the corresponding cluster, or (c) a standard deviation of the at least one parameter for the instances of probe data of the corresponding cluster. In an example embodiment, the first predefined epoch corresponds to a particular time window of a week. In an example embodiment, the particular time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, the computer program code is further configured to, when executed by the at least one processor, cause the apparatus to at least determining a number of unique vehicle identifiers in the first group for each cluster; and modifying at least one second element of the data structure with the number of unique vehicle identifiers in the first group for each cluster, the at least one second element corresponding to the first group and the first segment. In an example embodiment, performing the navigation function comprises using at least a portion of the data structure to predict a traffic parameter corresponding to the first segment. In an example embodiment, two or more clusters are identified when the distribution of parameters is multimodal.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least receive a plurality of instances of probe data. Each instance of probe data (a) corresponds to travel of a vehicle apparatus along a first segment, (b) comprises an indication of at least one parameter characterizing the travel of the vehicle apparatus along the first segment, and (c) comprises a timestamp. The computer-executable program code instructions further comprise program code instructions configured to, when executed by a processor of an apparatus, cause the apparatus to at least generate a plurality of groups of instances of probe data from the plurality of instance of probe data. A first group of the plurality of groups corresponds to a first predefined epoch and an instance of probe data is assigned to the first group of the plurality of groups based on the timestamp of the instance of probe data corresponding to a time within the first predefined epoch. The computer-executable program code instructions further comprise program code instructions configured to, when executed by a processor of an apparatus, cause the apparatus to at least extract the at least one parameter from each of the instances of probe data assigned to the first group to generate a distribution of parameters; and identify one or more clusters of instances of probe data of the first group based on the distribution parameters. The computer-executable program code instructions further comprise program code instructions configured to, when executed by a processor of an apparatus, cause the apparatus to at least responsive to identifying two or more clusters of instances of probe data of the first group determine a representative at least one parameter for each cluster of the two or more clusters, and modify at least one element of a data structure based on the representative at least one parameter for each cluster of the two or more clusters. The at least one element corresponding to the first segment and the first predefined epoch. The computer-executable program code instructions further comprise program code instructions configured to, when executed by a processor of an apparatus, cause the apparatus to at least, responsive to identifying only one cluster of instances of probe data in the first group, not modify the data structure based on the instances of probe data of the first group. A geographic database comprises the data structure and a navigation application is configured to use at least a portion of the geographic database that comprises the data structure to perform a navigation function.

In an example embodiment, (a) the at least one parameter comprises a speed of travel of the vehicle apparatus along at least a portion of the first segment, (b) the one or more clusters correspond to clusters of travel speed, and (c) the representative at least one parameter for each cluster comprises a representative travel speed for the corresponding cluster. In an example embodiment, the representative at least one parameter for each cluster comprises at least one of (a) a mean of the at least one parameter for the instances of probe data of the corresponding cluster, (b) a median of the at least one parameter for the instances of probe data of the corresponding cluster, or (c) a standard deviation of the at least one parameter for the instances of probe data of the corresponding cluster. In an example embodiment, the first predefined epoch corresponds to a particular time window of a week. In an example embodiment, the particular time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, the computer-executable program code instructions further comprise program code instructions configured to, when executed by a processor of an apparatus, cause the apparatus to at least determining a number of unique vehicle identifiers in the first group for each cluster; and modifying at least one second element of the data structure with the number of unique vehicle identifiers in the first group for each cluster, the at least one second element corresponding to the first group and the first segment. In an example embodiment, performing the navigation function comprises using at least a portion of the data structure to predict a traffic parameter corresponding to the first segment. In an example embodiment, two or more clusters are identified when the distribution of parameters is multimodal.

In still another aspect of the present invention, an apparatus is provided. In an example embodiment, the apparatus comprises means for receiving a plurality of instances of probe data. Each instance of probe data (a) corresponds to travel of a vehicle apparatus along a first segment, (b) comprises an indication of at least one parameter characterizing the travel of the vehicle apparatus along the first segment, and (c) comprises a timestamp. The apparatus comprises means for generating a plurality of groups of instances of probe data from the plurality of instance of probe data. A first group of the plurality of groups corresponds to a first predefined epoch. An instance of probe data is assigned to the first group of the plurality of groups based on the timestamp of the instance of probe data corresponding to a time within the first predefined epoch. In an example embodiment, the apparatus comprises means for extracting the at least one parameter from each of the instances of probe data assigned to the first group to generate a distribution of parameters. In an example embodiment, the apparatus comprises means for identifying one or more clusters of instances of probe data of the first group based on the distribution parameters. In an example embodiment, the apparatus comprises means for, responsive to identifying two or more clusters of instances of probe data of the first group determining a representative at least one parameter for each cluster of the two or more clusters, and modifying at least one element of a data structure based on the representative at least one parameter for each cluster of the two or more clusters. The at least one element corresponding to the first segment and the first predefined epoch. In an example embodiment, the apparatus comprises means for, responsive to identifying only one cluster of instances of probe data in the first group, not modifying the data structure based on the instances of probe data of the first group. A geographic database comprises the data structure and a navigation application is configured to use at least a portion of the geographic database that comprises the data structure to perform a navigation function.

In an example embodiment, a plurality of instances of event data are received. Each instance of event data (a) corresponds to a traffic event on a first segment and (b) comprises an indication of at least one parameter characterizing travel of a vehicle along the first segment during the traffic event. Based on the plurality of instances of event data, a recurring event corresponding to two or more instances of event data is identified. At least one representative parameter characterizing travel along the first segment during the recurring event is determined based on the two or more instances of event data corresponding to the recurring event. At least one element of a data structure is modified with the at least one representative parameter. The at least one element of the data structure corresponds to the first segment. A geographic database comprises the data structure and a navigation application is configured to use at least a portion of the geographic database that comprises the data structure to perform a navigation function.

According to an aspect of the present invention, a method for receiving, by a network apparatus comprising a processor, memory, and a communication interface configured to communicate via at least one network, a plurality of instances of event data. Each instance of event data (a) corresponds to a traffic event on a first segment and (b) comprises an indication of at least one parameter characterizing travel of a vehicle along the first segment during the traffic event. In an example embodiment, the method further comprises identifying, by the network apparatus, from the plurality of instances of event data, a recurring event corresponding to two or more instances of event data; and determining, by the network apparatus, at least one representative parameter characterizing travel along the first segment during the recurring event based on the two or more instances of event data corresponding to the recurring event. In an example embodiment, the method further comprises modifying, by the network apparatus, at least one element of a data structure with the at least one representative parameter. The at least one element of the data structure corresponding to the first segment. A geographic database comprises the data structure and a navigation application is configured to use at least a portion of the geographic database that comprises the data structure to perform a navigation function.

In an example embodiment, the at least one representative parameter comprises at least one of (a) speed of travel of a vehicle along at least a portion of the first segment, (b) a travel time for traversing the first segment, or (c) a travel speed to free flow speed for the first segment. In an example embodiment, (a) each instance of event data is associated with a timestamp and (b) the recurring event is associated with a predefined epoch. In an example embodiment, the predefined epoch corresponds to a predefined time window of a week. In an example embodiment, the predefined time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, performing the navigation function comprises using at least a portion of the data structure to predict a traffic parameter corresponding to the first segment. In an example embodiment, at least one instance of event data was generated by a lane-level real-time traffic engine. In an example embodiment, the event data was generated by the lane-level real-time traffic engine in response to the lane-level traffic engine identifying an event is occurring on the first segment based on real-time or near real-time probe data.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least receive a plurality of instances of event data. Each instance of event data (a) corresponding to a traffic event on a first segment and (b) comprising an indication of at least one parameter characterizing travel of a vehicle along the first segment during the traffic event. The computer program code is further configured to, when executed by the at least one processor, cause the apparatus to at least identify, from the plurality of instances of event data, a recurring event corresponding to two or more instances of event data. The computer program code is further configured to, when executed by the at least one processor, cause the apparatus to at least determine at least one representative parameter characterizing travel along the first segment during the recurring event based on the two or more instances of event data corresponding to the recurring event. The computer program code is further configured to, when executed by the at least one processor, cause the apparatus to at least modify at least one element of a data structure with the at least one representative parameter. The at least one element of the data structure corresponding to the first segment. A geographic database comprises the data structure and a navigation application is configured to use at least a portion of the geographic database that comprises the data structure to perform a navigation function.

In an example embodiment, the at least one representative parameter comprises at least one of (a) speed of travel of a vehicle along at least a portion of the first segment, (b) a travel time for traversing the first segment, or (c) a travel speed to free flow speed for the first segment. In an example embodiment, (a) each instance of event data is associated with a timestamp and (b) the recurring event is associated with a predefined epoch. In an example embodiment, the predefined epoch corresponds to a predefined time window of a week. In an example embodiment, the predefined time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, performing the navigation function comprises using at least a portion of the data structure to predict a traffic parameter corresponding to the first segment. In an example embodiment, at least one instance of event data was generated by a lane-level real-time traffic engine. In an example embodiment, the event data was generated by the lane-level real-time traffic engine in response to the lane-level traffic engine identifying an event is occurring on the first segment based on real-time or near real-time probe data.

According to still another aspect of the present invention, a computer program product is provided. In an example embodiment, the computer program product comprises at least one non-transitory computer-readable storage medium having computer-executable program code instructions stored therein. The computer-executable program code instructions comprise program code instructions configured to, when executed by a processor of an apparatus, cause the apparatus to at least receive a plurality of instances of event data. Each instance of event data (a) corresponding to a traffic event on a first segment and (b) comprising an indication of at least one parameter characterizing travel of a vehicle along the first segment during the traffic event. The computer-executable program code instructions comprise program code instructions further configured to, when executed by a processor of an apparatus, cause the apparatus to at least identify, from the plurality of instances of event data, a recurring event corresponding to two or more instances of event data. The computer-executable program code instructions comprise program code instructions further configured to, when executed by a processor of an apparatus, cause the apparatus to at least determine at least one representative parameter characterizing travel along the first segment during the recurring event based on the two or more instances of event data corresponding to the recurring event. The computer-executable program code instructions comprise program code instructions further configured to, when executed by a processor of an apparatus, cause the apparatus to at least one element of a data structure with the at least one representative parameter. The at least one element of the data structure corresponding to the first segment. A geographic database comprises the data structure and a navigation application is configured to use at least a portion of the geographic database that comprises the data structure to perform a navigation function.

In an example embodiment, the at least one representative parameter comprises at least one of (a) speed of travel of a vehicle along at least a portion of the first segment, (b) a travel time for traversing the first segment, or (c) a travel speed to free flow speed for the first segment. In an example embodiment, (a) each instance of event data is associated with a timestamp and (b) the recurring event is associated with a predefined epoch. In an example embodiment, the predefined epoch corresponds to a predefined time window of a week. In an example embodiment, the predefined time window corresponds to a predefined fifteen minute period of the week. In an example embodiment, the data structure comprises a segment identifier for the first segment. In an example embodiment, at least a portion of the data structure is linked to a link record in the geographic database corresponding to the first segment. In an example embodiment, performing the navigation function comprises using at least a portion of the data structure to predict a traffic parameter corresponding to the first segment. In an example embodiment, at least one instance of event data was generated by a lane-level real-time traffic engine. In an example embodiment, the event data was generated by the lane-level real-time traffic engine in response to the lane-level traffic engine identifying an event is occurring on the first segment based on real-time or near real-time probe data.

In still another aspect of the present invention, an apparatus is provided. In an example embodiment, the apparatus comprises means for receiving a plurality of instances of event data. Each instance of event data (a) corresponds to a traffic event on a first segment and (b) comprises an indication of at least one parameter characterizing travel of a vehicle along the first segment during the traffic event. In an example embodiment, the apparatus comprises means for identifying from the plurality of instances of event data, a recurring event corresponding to two or more instances of event data. In an example embodiment, the apparatus comprises means for determining at least one representative parameter characterizing travel along the first segment during the recurring event based on the two or more instances of event data corresponding to the recurring event. In an example embodiment, the apparatus comprises means for modifying at least one element of a data structure with the at least one representative parameter. The at least one element of the data structure corresponding to the first segment. A geographic database comprises the data structure and a navigation application is configured to use at least a portion of the geographic database that comprises the data structure to perform a navigation function.

BRIEF DESCRIPTION OF THE DRAWINGS

Figure 1:
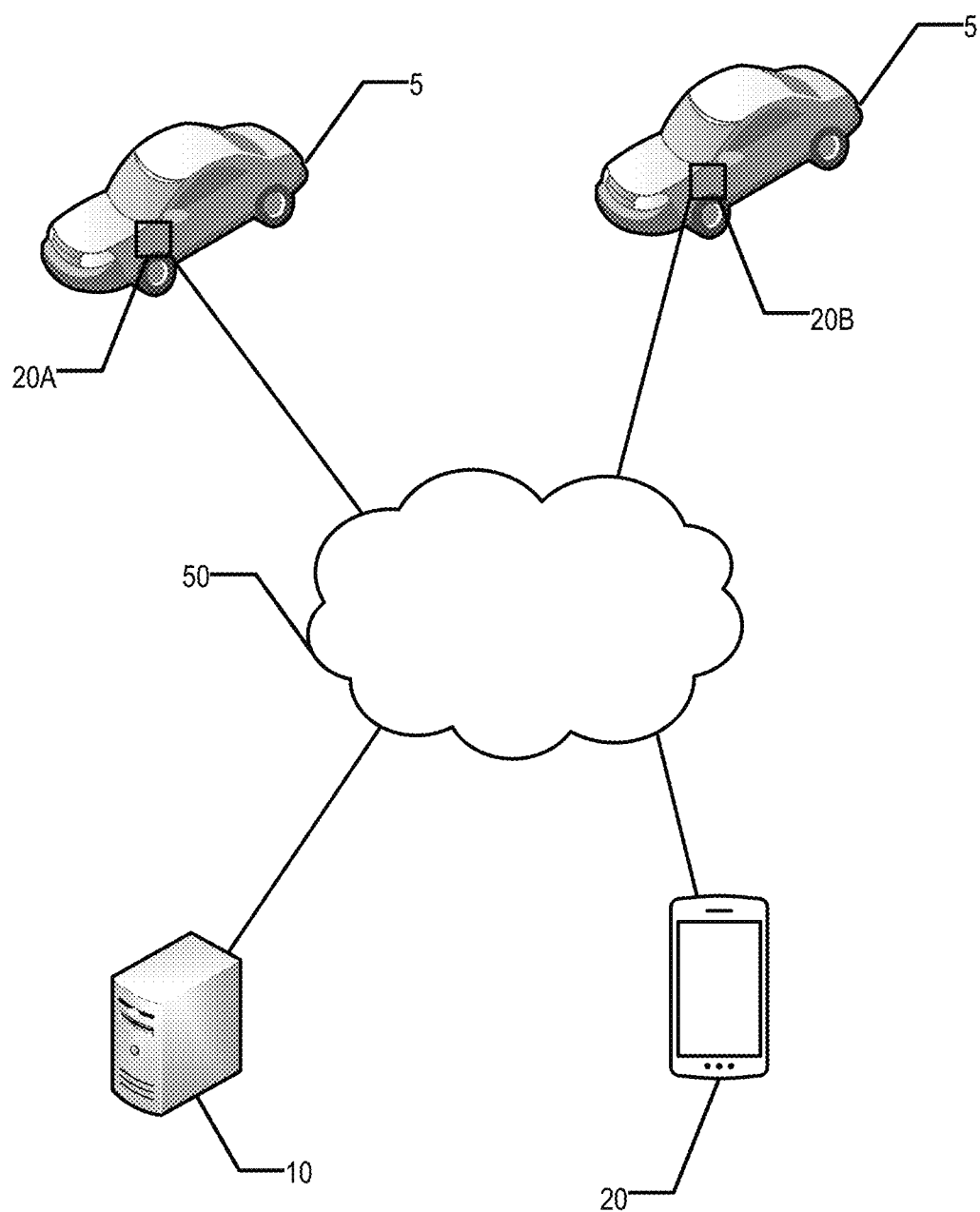
Figure 2A:
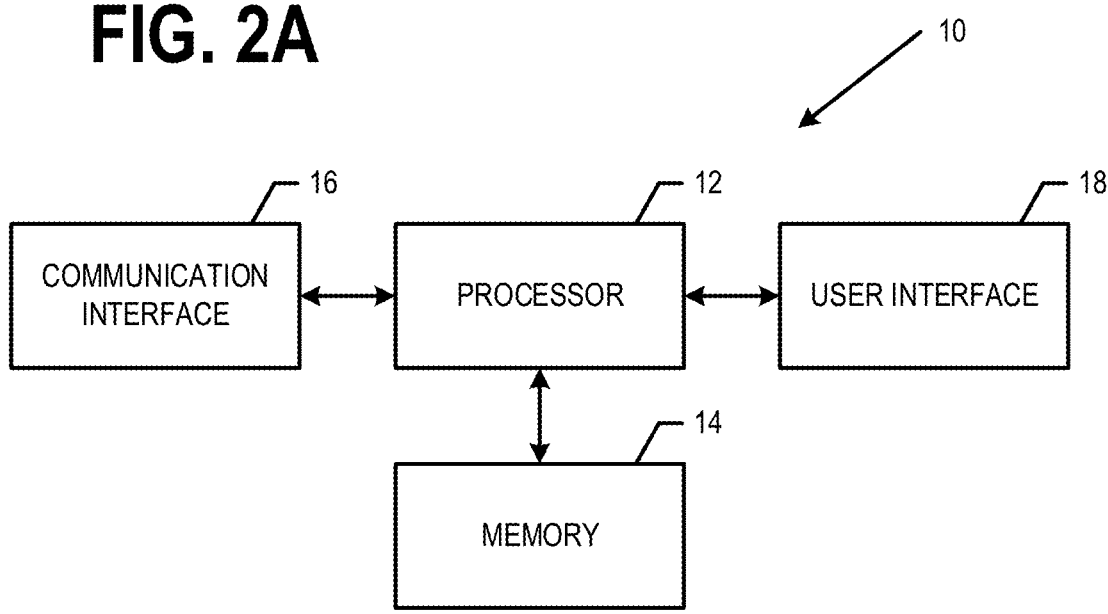
Figure 2B:
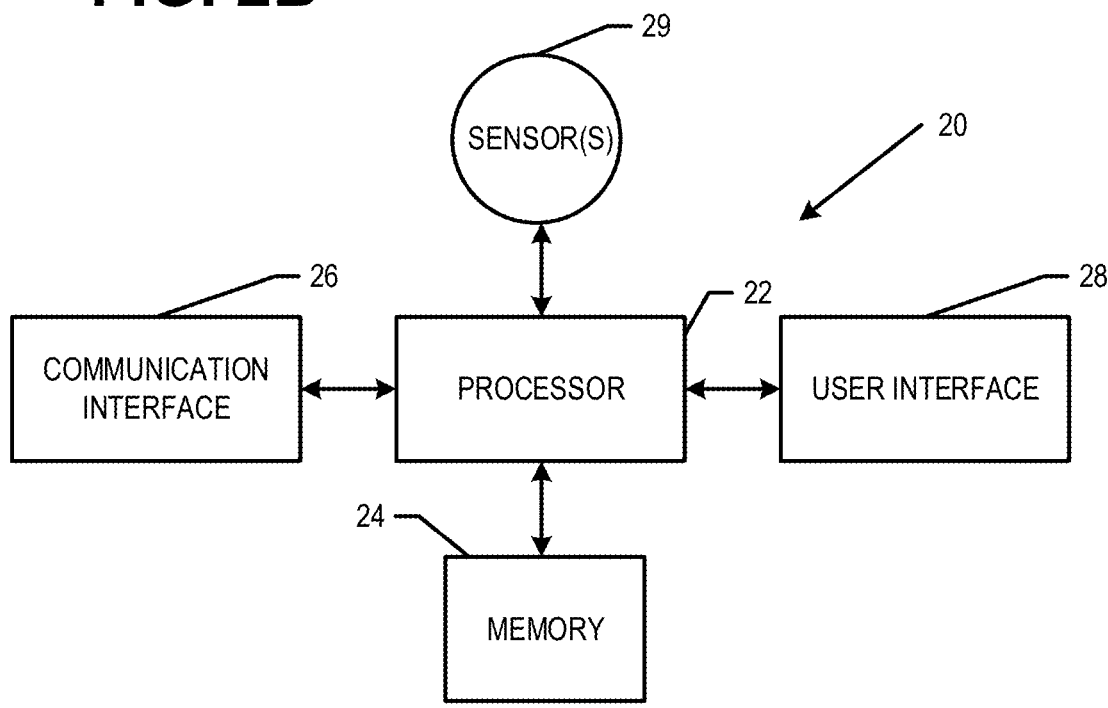
Figure 3:
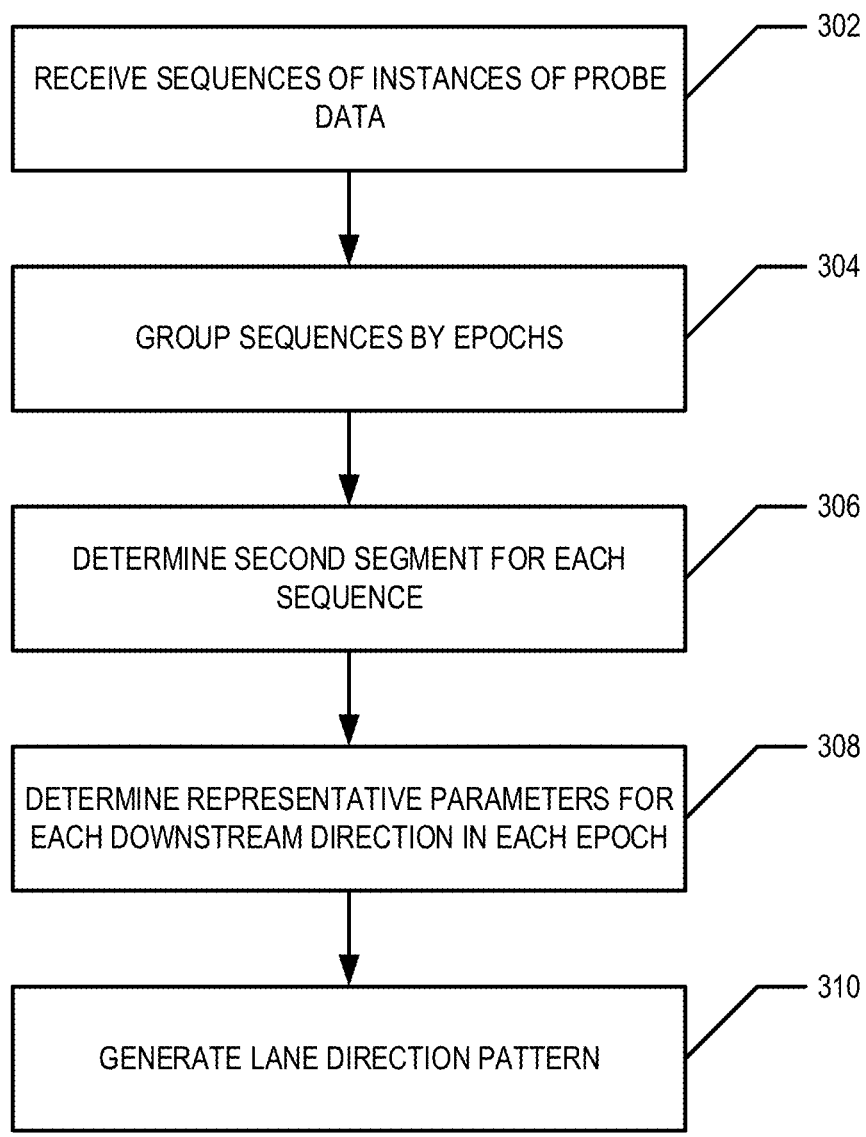
Figures 4, 5:
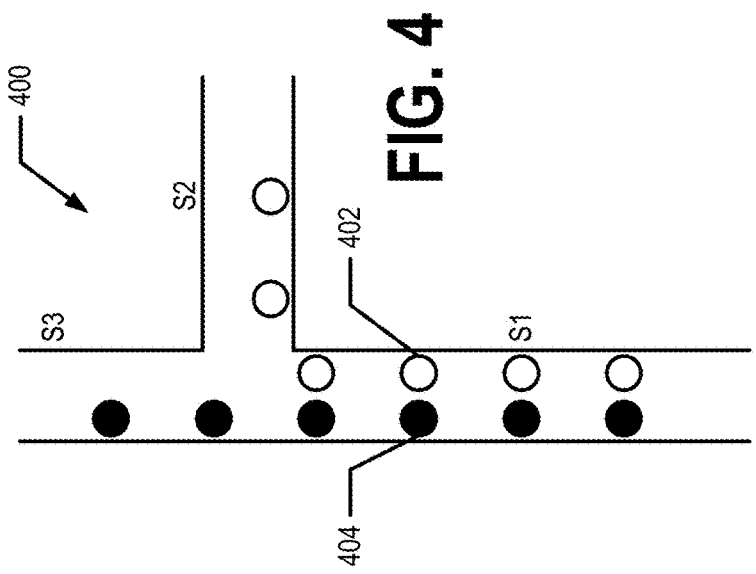
Figure 6:
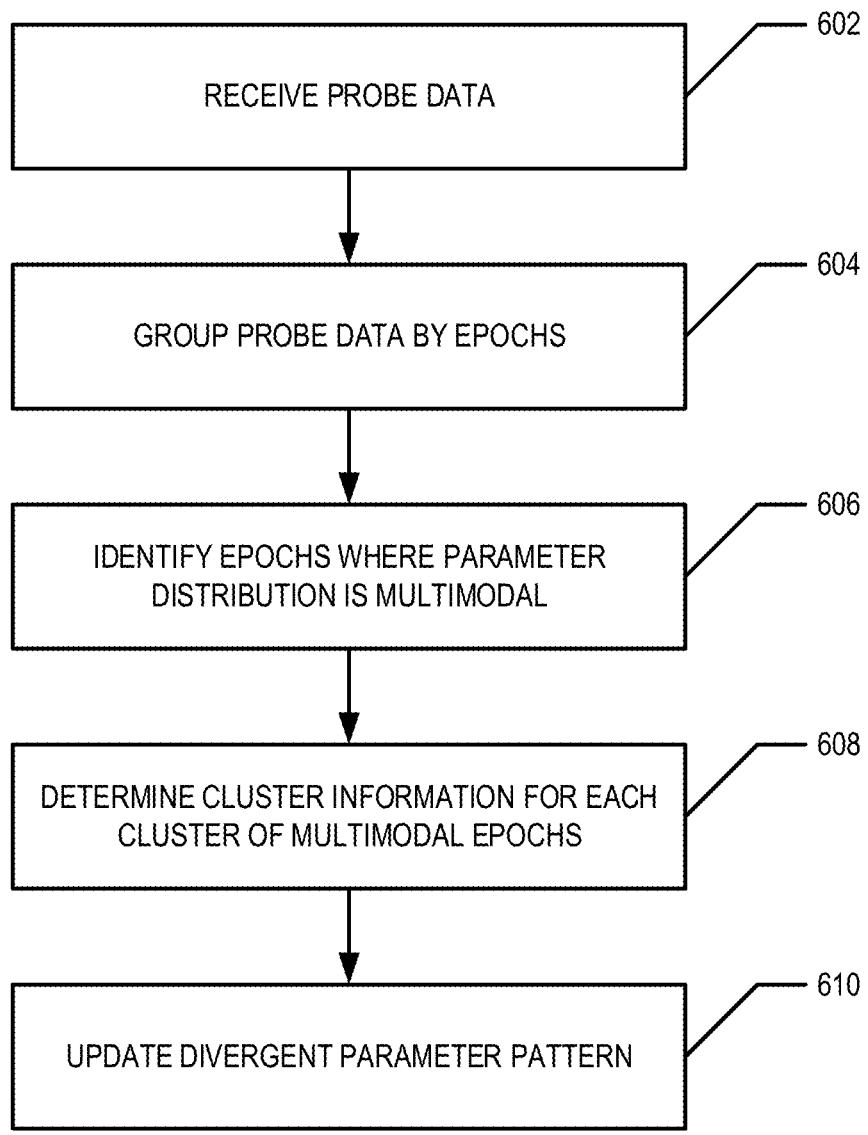
Figure 10:
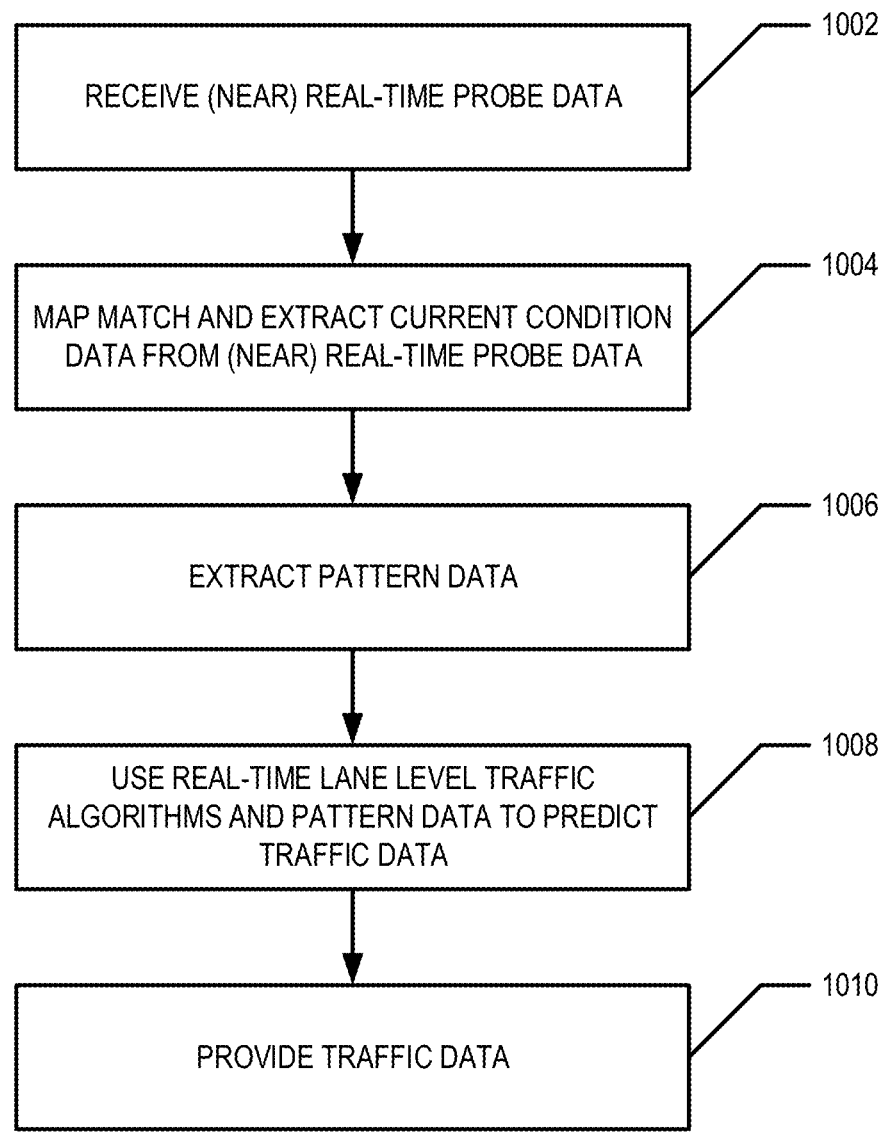

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a vehicle apparatus that may be specifically configured in accordance with an example embodiment;

FIG. 3 is a flowchart illustrating operations performed, such as by the network apparatus of FIG. 2A, to provide a lane direction pattern, according to an example embodiment;

FIG. 4 is a schematic diagram illustrating a plurality of instances of probe data provided by two different vehicle apparatuses, according to an example embodiment;

FIG. 5 is a schematic of an example format of a lane direction pattern, according to an example embodiment;

FIG. 6 is a flowchart illustrating operations performed, such as by the network apparatus of FIG. 2A, to provide a divergent parameter pattern, according to an example embodiment;

FIG. 7 illustrates pseudocode for determining a divergent parameter pattern for an epoch, according to an example embodiment;

FIG. 8 is a schematic example format of a divergent parameter pattern, according to an example embodiment;

FIG. 9 is a flowchart illustrating operations performed, such as by the network apparatus of FIG. 2A, to provide a lane event pattern, according to an example embodiment; and FIG. 10 is a flowchart illustrating operations performed, such as by the network apparatus of FIG. 2A, to generate (near) real-time traffic information/data based on lane direction pattern information/data, divergent parameter pattern information/data, and/or lane event pattern information/data and provide the (near) real-time traffic information/data, such as to a vehicle apparatus of FIG. 2B.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided for determining and/or generating lane direction patterns, divergent parameter patterns, and/or lane event patterns for one or more road segments of a road network; incorporating the lane direction patterns, divergent parameter patterns, and/or lane event patterns into a digital map and/or geographic database; and providing the digital map and/or geographic database to a vehicle apparatus (e.g., onboard and/or coupled to a vehicle) such that the lane direction patterns, divergent parameter patterns, and/or lane event patterns may be used (e.g., by a navigation application operating on the vehicle apparatus and/or network apparatus) to perform one or more navigation functions. In various embodiments, the lane direction patterns, divergent parameter patterns, and/or lane event patterns may be used (e.g., by the vehicle apparatus) to predict lane-level traffic conditions, lane-level traffic information/data, lane-level travel times, and/or the like. In various embodiments, the prediction(s) may be performed to determine a future lane-level traffic conditions, lane-level traffic information/data, lane-level travel times, and/or the like; estimate a current lane-level traffic conditions, lane-level traffic information/data, lane-level travel times, and/or the like when real-time information/data is not available due to lack of network connection/bandwidth and/or an insufficient number of probe apparatuses reporting real-time information/data for the subject road segments.

In various embodiments, a lane direction pattern is an information/data artifact, data structure, and/or object that indicates a representative parameter corresponding to a flow of traffic on a first segment for vehicles that travel the first segment to a subsequent second segment. In various embodiments, a divergent parameter pattern is an information/data artifact, data structure, and/or object that indicates a representative parameter corresponding to a cluster of traffic traversing a first segment. In various embodiments, a lane event pattern is an information/data artifact, data structure, and/or object that provides information regarding lane-level traffic events.

FIG. 1 provides an illustration of an example system that can be used in conjunction with various embodiments of the present invention. As shown in FIG. 1, the system may include one or more network apparatuses 10, one or more vehicle apparatuses 20 (e.g., 20A, 20B), wherein each vehicle apparatus 20 is disposed on a vehicle 5, one or more networks 50, and/or the like. In an example embodiment, a vehicle apparatus 20 may act as a probe apparatus and provide probe information/data to a network apparatus 10 (e.g., via one or more networks 50) and/or a vehicle apparatus 20 may be an apparatus that is using a digital map and/or geographic database of the present invention to perform one or more navigation functions.

In various embodiments, the vehicle apparatus 20, may be an in vehicle navigation system, vehicle control system, a mobile computing device, a mobile data gathering platform, and/or the like. For example, a vehicle apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the vehicle apparatus 20 may be a vehicle control system configured to autonomously drive a vehicle 5, assist in control of a vehicle 5 (e.g., an advanced driver-assistance system (ADAS)), monitor various aspects of the vehicle 5 (e.g., fault conditions, motor oil status, battery charge level, fuel tank fill level, and/or the like) and/or the like. In various embodiments, the vehicle apparatus 20 is configured to autonomously drive a vehicle 5 and may perform multiple functions that are similar to those performed by a vehicle apparatus 20 configured to be an ADAS (e.g., lane keeping, lane change assistance, maintaining a lane, merging, etc.). In some embodiments, vehicle apparatus 20 may be onboard a personal vehicle, commercial vehicle, public transportation vehicle, fleet vehicle, and/or other vehicle. In various embodiments, the vehicle apparatus 20 may be a smartphone, tablet, personal digital assistant (PDA), personal computer, desktop computer, laptop, and/or other mobile computing device. In an example embodiment, a vehicle apparatus 20 is onboard a vehicle 5 and is used to perform one or more navigation functions corresponding to the vehicle 5 traversing at least a portion of a road network. Some non-limiting examples of navigation functions are localization, route determination, lane level route determination, route travel time determination, lane maintenance, route guidance, lane level route guidance, provision of traffic information/data, provision of lane level traffic information/data, and/or the like.

In an example embodiment, the network apparatus 10 may be a server, group of servers, distributed computing system, and/or other computing system. For example, the network apparatus 10 may be in communication with one or more vehicle apparatuses 20, and/or the like via one or more wired and/or wireless networks 50. In an example embodiment, the network apparatus 10 is remotely located with respect to the vehicle apparatus 20 as the network apparatus 10 is not onboard and/coupled to the vehicle 5.

In an example embodiment, a network apparatus 10 may comprise components similar to those shown in the example network apparatus 10 diagrammed in FIG. 2A. In an example embodiment, the network apparatus 10 is configured to receive probe information/data from a user apparatus 20 via one or more networks 50; generate a lane direction pattern, a divergent parameter pattern, and/or a lane event pattern; incorporate the lane direction pattern, divergent parameter pattern, and/or lane event pattern into a digital map and/or geographic database; provide the digital map and/or geographic database to one or more vehicle apparatuses 20 via one or more networks 50; and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In various embodiments, a vehicle apparatus 20 is configured to generate probe information/data as the corresponding vehicle 5 traverses at least a portion of a road network; provide probe information/data to a network apparatus 10 via one or more networks 50; receive at least a portion of a digital map and/or geographic database from a network apparatus 10 via one or more networks 50; use the digital map and/or geographic database to perform one or more navigation functions; and/or the like. In an example embodiment, as shown in FIG. 2B, the vehicle apparatus 20 may comprise a processor 22, memory 24, a communications interface 26, a user interface 28, and one or more sensors 29. In an example embodiment, the one or more sensors may comprise one or more of one or more location sensors such one or more of a GNSS sensor; IMU sensors; an odometry system, and/or the like; and/or other components configured to perform various operations, procedures, functions or the like described herein. For example, in an example embodiment, a vehicle apparatus 20 may comprise and/or be in communication with one or more sensors 29 comprising one or more of, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters). In at least some example embodiments, the memory 24 is non-transitory.

In an example embodiment, the network apparatus 10 may be in communication with one or more of vehicle apparatuses 20 via one or more wired and/or wireless networks 50. For example, each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, short and/or medium range communications, and/or the like. In some embodiments, a network 50 may comprise the automotive cloud, digital transportation infrastructure (DTI), radio data system (RDS)/high definition (HD) radio or other digital radio system, and/or the like. For example, a vehicle apparatus 20 may be in communication with a network apparatus 10 via the network 50. For example, a vehicle apparatus 20 may communicate with the network apparatus 10 via a network, such as the Cloud. For example, the Cloud may be a computer network that provides shared computer processing resources and data to computers and other devices connected thereto.

Certain example embodiments of the network apparatus 10 and/or vehicle apparatus 20 are described in more detail below with respect to FIGS. 2A and 2B.

II. Example Operation

Example embodiments provide methods, apparatus, systems, computer program products, and/or the like for determining and/or generating lane direction patterns, divergent parameter patterns, and/or lane event patterns for one or more road segments of a road network; incorporating the lane direction patterns, divergent parameter patterns, and/or lane event patterns into a digital map and/or geographic database; and providing the digital map and/or geographic database to a vehicle apparatus (e.g., onboard and/or coupled to a vehicle) such that the lane direction patterns, divergent parameter patterns, and/or lane event patterns may be used (e.g., by the vehicle apparatus) to perform one or more navigation functions. In various embodiments, the lane direction patterns, divergent parameter patterns, and/or lane event patterns may be used (e.g., by the vehicle apparatus) to predict lane-level traffic conditions, lane-level traffic information/data, lane-level travel times, and/or the like. In various embodiments, the prediction(s) may be performed to determine a future lane-level traffic conditions, lane-level traffic information/data, lane-level travel times, and/or the like; estimate a current lane-level traffic conditions, lane-level traffic information/data, lane-level travel times, and/or the like when real-time information/data is not available due to lack of network connection/bandwidth and/or an insufficient number of probe apparatuses reporting real-time information/data for the subject road segments. These predictions may then be used to perform one or more navigation functions, such as localization, route determination, lane level route determination, route travel time determination, lane maintenance, route guidance, lane level route guidance, provision of traffic information/data, provision of lane level traffic information/data, and/or the like.

In various embodiments, a lane direction pattern is an information/data artifact, data structure, and/or object that indicates a representative parameter corresponding to a flow of traffic on a first segment for vehicles that travel the first segment to a subsequent second segment. In various embodiments, a divergent parameter pattern is an information/data artifact, data structure, and/or object that indicates a representative parameter corresponding to a cluster of traffic traversing a first segment. In various embodiments, a lane event pattern is an information/data artifact, data structure, and/or object that provides information regarding lane-level traffic events.

In various embodiments, a lane direction pattern, divergent parameter pattern, and/or lane event pattern may be generated for each tile of a digital map, for each link of a digital map, and/or the like. The lane direction pattern, divergent parameter pattern, and/or lane event pattern may be stored as a part and/or in a layer of a tile of a digital map and/or stored in a geographic database in accordance with the corresponding digital map tile. For example, the digital map may be tiled such that map information/data may be stored, received, provided, transmitted, and/or the like in a modular format (e.g., tile by tile). In various embodiments, the tiles may be defined by a set of parallel and perpendicular tile boundaries. For example, the tiles may be rectangular or square (e.g., 2 km by 2 km squares). In other embodiments, the tiles may be defined by boundaries which are curved, not parallel and/or perpendicular to one or more other boundaries, and/or the like. In various embodiments, the tiles may be a uniform tiling of the digital map. In other embodiments, the tiles may vary in size and/or shape based on the geography of the map region, the topology of the map region, population density within the map region, and/or the like.

In various embodiments, the lane direction pattern(s), divergent parameter pattern(s), and/or lane event pattern(s) corresponding to a tile of the digital map may be updated. For example, The lane direction pattern(s), divergent parameter pattern(s), and/or lane event pattern(s) corresponding to a tile of the digital map may be updated periodically, regularly, when it is determined that the lane direction pattern(s), divergent parameter pattern(s), and/or lane event pattern(s) have likely changed (e.g., probe information/data suggesting a segment has been expanded to include another lane, re-lined to change traffic patterns along the segment, and/or the like is received, processed, and/or the like), and/or the like. An updated version of the tile may include the updates to the lane direction pattern(s), divergent parameter pattern(s), and/or lane event pattern(s) corresponding to a tile of the digital map and/or may include a new and/or updated version of the lane direction pattern(s), divergent parameter pattern(s), and/or lane event pattern(s) corresponding to a tile of the digital map. The generation and/or determination of each lane direction patterns, divergent parameter patterns, and lane event patterns will now be described in more detail.

Lane Direction Pattern

In various embodiments, a lane direction pattern is an information/data artifact, data structure, and/or object that indicates one or more representative parameters corresponding to a flow of traffic on a first segment for vehicles that travel the first segment to a subsequent second segment. For example, if the first segment ends at a four way intersection (e.g., a vehicle can turn right, turn left, or continue forward), the lane direction pattern may indicate three representative parameters corresponding to the flow of traffic on the first segment with each of the representative parameters corresponding to one of the second segments available for a vehicle to travel immediately after traveling the first segment. In an example embodiment, the representative parameter corresponding to a first segment and a corresponding second segment is an average (e.g., mean, median, or mode) speed of traffic on the first segment. In an example embodiment, the representative parameters comprise a travel speed corresponding to the speed of vehicles at a particular point along the first segment, an average travel speed along at least a portion of the first segment, and/or other travel speed corresponding to the first segment. In an example embodiment, the representative parameters comprise a travel speed to free flow speed ratio, a travel time for traversing the first segment, and/or the like.

In various embodiments, the representative parameters corresponding to the first segment and a subsequent second segment are determined based on probe information/data captured by vehicle apparatuses as the vehicle apparatuses traversed the first segment. For example, a vehicle apparatus 20 traversing the first segment and a subsequent second segment may provide, transmit, and/or the like probe information/data. In an example embodiment, an instance of probe information/data comprises a location at which the instance of probe information/data was captured as determined by one or more location sensors of the vehicle apparatus, a timestamp indicating the date and/or time at which the instance of probe information/data was captured, an apparatus identifier configured to uniquely identify the vehicle apparatus 20 that captured the instance of probe information/data, and/or the like. In various embodiments, an instance of probe information/data may comprise various other parameters and/or sensor information/data captured by any combination of the one or more sensors 29.

In an example embodiment, the representative parameters corresponding to first segment and a subsequent second segment corresponding to the flow of traffic on the first segment that next traveled along the second segment. In various scenarios, the subsequent second segment generally indicates a lane traveled by the vehicle apparatus 20 that generated the corresponding probe information/data. For example, if a vehicle apparatus 20 traveled the first segment and then took a right onto the subsequent second segment, the vehicle apparatus 20 was likely onboard a vehicle 5 that was in the right lane of the first segment (for at least a portion of the first segment). Thus, the subsequent second segment may be used to classify groups of sequences of instances of probe information/data, where each sequence of instances of probe information/data was provided by a different vehicle apparatus 20. The groups may then be interpreted to the lane of the first segment the corresponding vehicle apparatuses 20 likely traveled for at least a part of the first segment (e.g., the portion of the first segment approaching the intersection between the first segment and the second segment, for example). For example, the sequence of instances of probe information/data may be used to determine the subsequent second segment traveled by the corresponding vehicle apparatus 20, such that the probe information/data provided by the corresponding vehicle apparatus 20 may be classified, grouped, and/or the like based on the corresponding subsequent second segment.

In various embodiments, the sequences of instances of probe information/data and/or the representative parameters determined therefrom correspond to an epoch. In an example embodiment, an epoch is a particular period of time or predefined window of time. For example, a week or other period of time (e.g., month, day, and/or the like) may be divided epochs. For example, a week or other period of time may be divided into a plurality of time windows that are each 10 minutes, 15 minutes, 20 minutes, 30 minutes, and/or the like long. For example, a first epoch may be defined from 12:01 AM on Monday to 12:15 AM on Monday and a second epoch may be defined from 12:16 AM on Monday to 12:30 AM on Monday, and/or the like. In various embodiments, each epoch is associated with an epoch identifier configured to uniquely identify that epoch and/or the predefined window of time.

FIG. 3 provides a flowchart illustrating various processes, procedures, operations, and/or the like that may be performed, by the network apparatus 10, in various embodiments, to generate, determine, and/or update a lane direction pattern. Starting at block 302, one or more sequences of instances of probe information/data are received. For example, the network apparatus 10 may receive one or more sequences of instances of probe information/data. For example, the network apparatus 10 may comprise means, such as processor 12, memory 14, communications interface 16, and/or the like, for receiving one or more sequences of instances of probe information/data. Each instance of probe information/data is captured, generated, determined and/or the like and provided by a vehicle apparatus 20 as the vehicle the vehicle apparatus 20 is onboard and/or coupled to traverses the first and subsequent second segments. In an example embodiment, the network apparatus 10 may receive and process the instances of probe information/data in real-time or near real-time. In an example embodiment, the instances of probe information/data may be accessed from a data store for batch processing. In an example embodiment, the received sequences of probe information/data may comprise a plurality of instances of probe information/data that correspond to a vehicle apparatus 20 and/or corresponding vehicle 5 traversing a plurality of segments within a road network. In an example embodiment, the received sequences may be split into smaller sequences that each correspond to and/or consist of data corresponding to at least a portion of the vehicle apparatus 20 and/or corresponding vehicle's 5 path along a first segment and the subsequent second segment.

In an example embodiment, an instance of probe information/data comprises a location at which the instance of probe information/data was captured as determined by one or more location sensors of the vehicle apparatus, a timestamp indicating the date and/or time at which the instance of probe information/data was captured, an apparatus identifier configured to uniquely identify the vehicle apparatus 20 that captured the instance of probe information/data, and/or the like. In various embodiments, an instance of probe information/data may comprise various other parameters and/or sensor information/data captured by any combination of the one or more sensors 29. In an example embodiment, the sequences of instances of probe information/data are each a plurality of instances of probe information/data that have been linked via the apparatus identifier (e.g., all of the instances of probe information/data in a sequence comprise the same apparatus identifier, in an example embodiment) and are ordered (e.g., chronologically) based on the timestamps of the instances of probe information/data of the sequence. Thus, based on the location of the instances of probe information/data of the sequence, the first segment and the subsequent second segment corresponding to the sequence can be determined.

At block 304, the one or more sequences corresponding to the first segment are grouped by epoch. For example, each of the one or more sequences may be assigned to and/or grouped into an epoch. For example, the network apparatus 10 may group the sequences of instances of probe information/data into epochs. For example, the network apparatus 10 may comprise means, such as the processor 12, memory 14, and/or the like, for grouping the sequences of instances of probe information/data into epochs. In an example embodiment, an epoch is a particular period of time or predefined window of time. For example, a week or other period of time (e.g., month, day, and/or the like) may be divided epochs. For example, a week or other period of time may be divided into a plurality of time windows that are each 10 minutes, 15 minutes, 20 minutes, 30 minutes, and/or the like long. For example, a first epoch may be defined from 12:01 AM on Monday to 12:15 AM on Monday and a second epoch may be defined from 12:16 AM on Monday to 12:30 AM on Monday, and/or the like. In various embodiments, each epoch is associated with an epoch identifier configured to uniquely identify that epoch and/or the predefined window of time. Based on a timestamp corresponding to at least one instance of probe information/data of a sequence, the sequence is assigned to and/or grouped into an epoch. For example, the timestamp corresponding to the first instance of probe information/data of the sequence with a location corresponding to the first segment, the last instance of probe information/data of the sequence with a location corresponding to the first segment, the first instance of probe information/data of the sequence with a location corresponding to the subsequent second segment, and/or the like, may be used to assign a sequence to and/or group a sequence into an epoch.

At block 306, the second segment corresponding to a sequence is determined. For example, the second segment corresponding to each sequence corresponding to the first segment may be determined. For example, the second segment (also referred to herein as the subsequent second segment) is the segment the vehicle apparatus 20 and/or the corresponding vehicle 5 traverses immediately after leaving the first segment. For example, FIG. 4 shows two sequences of instances of probe information/data 402 and 404 as corresponding vehicles 5 traverse at least a portion of part of a road network 400 comprising a first segment S1, a right turn segment S2, and a forward segment S3. The vehicle 5 corresponding to sequence 402, shown by the open circles, traverses the first segment S1 and then turns onto the right turn segment S2. Thus, the subsequent second segment for sequence 402 is the right turn segment S2. The vehicle 5 corresponding to sequence 404, shown by the filled circles, traverses the first segment S1 and then continues onto the forward segment S3. Thus, the subsequent second segment for sequence 404 is the forward segment S3.

In an example embodiment, the network apparatus 10 determines the second segment corresponding to each sequence of instances of probe information/data. For example, the network apparatus 10 may comprise means, such as processor 12, memory 14, and/or the like, for determining the second segment corresponding to each sequence of instances of probe information/data. The sequences may then be grouped or classified within each epoch based on the second segment corresponding to the sequence. Thus, in various embodiments, a sequence may be grouped and/or classified based on the corresponding epoch and/or subsequent second segment. As should be understood, the classifying and/or grouping of sequences by epoch and subsequent second segment may be performed in the reverse order as described herein (e.g., block 306 could be performed before block 304).

Continuing with FIG. 3, at block 308, one or more representative parameters are determined for each downstream direction (e.g., each second segment) for each epoch. For example, the network apparatus 10 may determine one or more representative parameters for each epoch for each second segment available from the first segment. For example, the network apparatus 10 may comprise means, such as the processor 12, memory 14, and/or the like, for determining one or more representative parameters for each epoch for each second segment available from the first segment. For example, a representative parameter for a particular epoch and a particular second segment may be determined by averaging and/or otherwise analyzing the corresponding parameters of sequences of instances of probe information/data corresponding to the particular epoch and the particular second segment. For example, a first parameter may be extracted from each sequence corresponding to a particular epoch and a particular second segment to generate a distribution of parameters. The distribution of parameters may then be analyzed (e.g., summed, averaged, fit with one or more distribution models, and/or the like) to determine one or more representative parameters corresponding to the particular epoch and the particular second segment from the distribution of parameters extracted from the sequences corresponding to the particular epoch and the particular second segment. For example an average (e.g., mean, median, or mode) speed of travel along the first segment, along a portion of the first segment, and/or at a particular point along the first segment may be determined. In an example embodiment, the one or more parameters may comprise travel speed, a travel speed to free flow speed ratio, a travel time for traversing the first segment, and/or the like. In an example embodiment, the one or more representative parameters include a number of sequences corresponding to the particular epoch and the particular second segment, a rate of vehicles (e.g., average number of vehicles per minute during the particular epoch) corresponding to the particular second segment, and/or other indication of the volume of traffic and/or number of vehicles traveling along the first segment that continued onto the particular second segment during the particular epoch.

At block 310, a lane direction pattern is generated, updated, and/or the like. In various embodiments, a lane direction pattern is an information/data artifact, data structure, and/or object that indicates a representative parameter corresponding to a flow of traffic on a first segment for vehicles that travel the first segment to a subsequent second segment. In an example embodiment, a lane direction pattern is stored as a table; a flat data file; an annotated data file; as part of a binary large object, virtual table, and/or the like.

For example, the network apparatus 10 may generate and/or update a lane direction pattern. For example, the network apparatus 10 may comprise means, such as the processor 12, memory 14, and/or the like for generating and/or updating a lane direction pattern. For example, a new entry may be added to the lane direction pattern and/or an existing entry of the lane direction pattern may be modified. In an example embodiment, the lane direction pattern may correspond to only one first segment. In an example embodiment, the lane direction pattern may correspond to a plurality of first segments located in a geographic area. For example, a lane direction pattern may comprise information/data corresponding to each first segment and/or a plurality of first segments in a tile of a digital map, in a city/town, in a county, in a state/province, in a country, and/or other geographic area. The lane direction pattern may then be stored in a geographic database, in a layer of a digital map, used to update a lane direction pattern stored in a geographic database and/or a layer of a digital map, and/or the like. For example, a lane direction pattern that corresponds to one first segment may be added to and/or linked to a corresponding link record of a geographic database and/or digital map. For example, one or more portions, entries, rows, and/or the like of a lane direction pattern that corresponds to a plurality of first segments may be linked to a corresponding link record of a geographic database and/or digital map. In an example embodiment, the linking is performed via the inclusion of a link identifier that corresponds to the link entry corresponding to the first segment in the metadata, portions, entries, rows, and/or the like of the lane direction pattern.

FIG. 5 illustrates a format of an example lane direction pattern 500, according to an example embodiment. For example, the lane direction pattern 500 may be a table comprising a row corresponding to each second segment for each epoch. In an example embodiment the lane direction pattern 500 table comprises a column that is populated with a timestamp and/or epoch identifier for identifying the epoch corresponding to each row of the table. In an example embodiment, the lane direction pattern 500 table comprises a column that is populated with a segment identifier (e.g., segment ID) identifying the first segment corresponding to each row of the table. In an example embodiment, the segment ID may be provided as a string and/or may be used to link and/or identify a corresponding link record to that row of the table. In an example embodiment, the lane direction pattern 500 table comprises a column that is populated with a segment length corresponding to the length of the first segment of the corresponding row of the table. For example, the segment length may be provided as a float in meters, feet, kilometers, miles, and/or the like. In an example embodiment, the lane direction pattern 500 table comprises a column that is populated with a second segment identifier (e.g., second segment ID) identifying the subsequent second segment corresponding to each row of the table. For example, the second segment ID may be provided as a string and/or used to infer a travel lane of the first segment corresponding to the one or more representative parameters of the row. In the illustrated embodiment, the lane direction pattern 500 table comprises the representative parameters of mean speed, standard deviation of speed, median speed, and probe count (e.g., number of sequences corresponding to the particular epoch and the particular second segment). The mean speed, standard deviation of speed, and median speed may be determined (e.g., at block 308) based on the distribution of travel speeds corresponding to and/or extracted from the sequences of instances of probe information/data corresponding to the particular epoch and the particular second segment. In an example embodiment, the travel speed corresponding to and/or extracted from a sequence is a travel speed corresponding to the speed of the vehicle apparatus 20 that captured the instances of probe information/data of the sequence and/or the corresponding vehicle 5 at a particular point along the first segment, an average travel speed of the vehicle apparatus 20 and/or corresponding vehicle 5 along at least a portion of the first segment, and/or other travel speed corresponding the vehicle apparatus 20 and/or the corresponding vehicle 5 traveling along the first segment. In an example embodiment, the mean speed, standard deviation of speed, and median speed are provided as floats. The probe count may be a number of sequences analyzed to determine the representative parameters corresponding to the particular epoch and the particular second segment for the first segment. In an example embodiment, the sequences may correspond to multiple days, weeks, or months' worth of probe information/data. For example, if an epoch is defined a particular time window of a week, a probe information/data from a plurality of weeks may be combined to determine the representative parameters for the epoch. The probe count may then be determined by dividing the total number of sequences corresponding to the particular epoch and the particular segment for the first segment divided by the number of weeks' worth of probe information/data that was combined.

Once the geographic database and/or one or more tiles of the digital map have been updated to include the lane direction pattern, and/or an updated version of the lane direction pattern, the geographic database and/or one or more tiles of the digital map may be provided to one or more vehicle apparatuses 20. There may or may not be overlap between the one or more vehicle apparatuses 20 that provided instances of probe information/data and that receive the geographic database and/or one or more tiles of the digital map comprising the lane direction pattern, in various embodiments. For example, the network apparatus 10 may update the geographic database and/or one or more tiles of the digital map and/or provide the geographic database and/or one or more tiles of the digital map to one or more vehicle apparatuses 20. For example, the network apparatus 10 may comprise means, such as processor 12, memory 14, communications interface 16, and/or the like for updating the geographic database and/or one or more tiles of the digital map and/or providing the geographic database and/or one or more tiles of the digital map to one or more vehicle apparatuses 20.

In various embodiments, a vehicle apparatus 20 (e.g., onboard and/or coupled to a vehicle 5) may use one or more lane direction patterns of the geographic database and/or digital map to perform one or more navigation functions. In various embodiments, the lane direction pattern(s) may be used (e.g., e.g., by a navigation application operating on the vehicle apparatus and/or network apparatus) to predict lane-level traffic conditions, lane-level traffic information/data, lane-level travel times, and/or the like. In various embodiments, the prediction(s) may be performed to determine a future lane-level traffic conditions, lane-level traffic information/data, lane-level travel times, and/or the like; estimate a current lane-level traffic conditions, lane-level traffic information/data, lane-level travel times, and/or the like when real-time information/data is not available due to lack of network connection/bandwidth and/or an insufficient number of probe apparatuses reporting real-time information/data for the subject road segments. These predictions may then be used (e.g., by the vehicle apparatus 20 and/or the network apparatus 10) to perform one or more navigation functions, such as localization, route determination, lane level route determination, route travel time determination, lane maintenance, route guidance, lane level route guidance, provision of traffic information/data, provision of lane level traffic information/data, and/or the like.

Divergent Parameter Pattern

In various embodiments, a divergent parameter pattern is an information/data artifact, data structure, and/or object that indicates one or more representative parameters corresponding to a cluster of traffic traversing a first segment. For example, the divergent parameter pattern may provide representative parameters for first segments where traffic in one or more of the lanes of the first segment travels at a different speed than traffic in one or more other lanes. For example, the divergent parameter pattern comprises a representative parameter corresponding to a cluster of traffic traversing a first segment for first segments where the distribution of parameters corresponding to traffic traversing the first segment is multimodal. In an example embodiment, the representative parameter corresponding to a first segment is an average (e.g., mean, median, or mode) speed of traffic on the first segment. In an example embodiment, the representative parameters comprise a travel speed corresponding to the speed of vehicles at a particular point along the first segment, an average travel speed along at least a portion of the first segment, and/or other travel speed corresponding to the first segment. In an example embodiment, the representative parameters comprise a travel speed to free flow speed ratio, a travel time for traversing the first segment, and/or the like.

In various embodiments, the representative parameters corresponding to the first segment are determined based on probe information/data captured by vehicle apparatuses 20 as the vehicle apparatuses traversed the first segment. For example, a vehicle apparatus 20 traversing the first segment may provide, transmit, and/or the like probe information/data. In an example embodiment, an instance of probe information/data comprises a location at which the instance of probe information/data was captured as determined by one or more location sensors of the vehicle apparatus, a timestamp indicating the date and/or time at which the instance of probe information/data was captured, an apparatus identifier configured to uniquely identify the vehicle apparatus 20 that captured the instance of probe information/data, and/or the like. In various embodiments, an instance of probe information/data may comprise various other parameters and/or sensor information/data captured by any combination of the one or more sensors 29. Instances of probe information/data may be analyzing independently (e.g., one or more instances of probe information/data captured by a particular vehicle apparatus 20 may be considered) and/or grouped into sequences of instances of probe information/data that was captured by the same vehicle apparatus 20 and ordered (e.g., chronologically) based on the timestamps of the instances of probe information/data.

In an example embodiment, the representative parameters corresponding to the first segment correspond to the flow of traffic on the first segment. In an example embodiment, a first segment is only included in the divergent parameter pattern for a particular epoch if the distribution of at least one parameter corresponding to the first segment and the particular epoch is multimodal. In various scenarios, the multimodality of the parameter distribution and/or clustering of the parameters about multiple values may indicate that at least one first lane of the first segment is experiencing different traffic conditions than at least one second lane of the first segment. For example, a right hand lane of a highway that becomes an exit only lane may be experiencing different traffic conditions than the neighboring through lanes of the highway. In another example, a left turn lane of a surface road may experience different traffic conditions than the neighboring through and/or right turning lanes of the surface road. Thus, the multimodality and/or clustering of the parameter distribution corresponding to the first segment and the particular epoch may provide insight and/or allow for inference of various lane-level traffic conditions of the first segment during the particular epoch.

In various embodiments, the instances of probe information/data and/or the representative parameters determined therefrom correspond to an epoch. In an example embodiment, an epoch is a particular period of time or predefined window of time. For example, a week or other period of time (e.g., month, day, and/or the like) may be divided epochs. For example, a week or other period of time may be divided into a plurality of time windows that are each 10 minutes, 15 minutes, 20 minutes, 30 minutes, and/or the like long. For example, a first epoch may be defined from 12:01 AM on Monday to 12:15 AM on Monday and a second epoch may be defined from 12:16 AM on Monday to 12:30 AM on Monday, and/or the like. In various embodiments, each epoch is associated with an epoch identifier configured to uniquely identify that epoch and/or the predefined window of time.

FIG. 6 provides a flowchart illustrating various processes, procedures, operations, and/or the like that may be performed, by the network apparatus 10, in various embodiments, to generate, determine, and/or update a divergent parameter pattern. Starting at block 602, one or more instances of probe information/data are received. For example, the network apparatus 10 may receive one or more instances of probe information/data. For example, the network apparatus 10 may comprise means, such as processor 12, memory 14, communications interface 16, and/or the like, for receiving one or more instances of probe information/data. Each instance of probe information/data is captured, generated, determined and/or the like and provided by a vehicle apparatus 20 as the vehicle 5 the vehicle apparatus 20 is onboard and/or coupled to traverses the first segment. In an example embodiment, the network apparatus 10 may receive and process the instances of probe information/data in real-time or near real-time. In an example embodiment, the instances of probe information/data may be accessed from a data store for batch processing. In an example embodiment, each instance of probe information/data is processed independently and one or more instances probe information/data are processed for a particular vehicle apparatus 20. In an example embodiment, the instances of probe information/data captured by the particular vehicle apparatus 20 are processed together as a sequence of instances of probe information/data. In an example embodiment, the sequences of probe information/data may comprise a plurality of instances of probe information/data that correspond to a vehicle apparatus 20 and/or corresponding vehicle 5 traversing a plurality of segments within a road network. In an example embodiment, the received sequences may be split into smaller sequences that each correspond to and/or consist of data corresponding to at least a portion of the vehicle apparatus 20 and/or corresponding vehicle's 5 path along the first segment.

In an example embodiment, an instance of probe information/data comprises a location at which the instance of probe information/data was captured as determined by one or more location sensors of the vehicle apparatus, a timestamp indicating the date and/or time at which the instance of probe information/data was captured, an apparatus identifier configured to uniquely identify the vehicle apparatus 20 that captured the instance of probe information/data, and/or the like. In various embodiments, an instance of probe information/data may comprise various other parameters and/or sensor information/data captured by any combination of the one or more sensors 29. In an example embodiment, a sequence of instances of probe information/data comprises a plurality of instances of probe information/data that have been linked via the apparatus identifier (e.g., all of the instances of probe information/data in a sequence comprise the same apparatus identifier, in an example embodiment) and are ordered (e.g., chronologically) based on the timestamps of the instances of probe information/data of the sequence.

At block 604, the one or more instances of probe information/data and/or sequences corresponding to the first segment are grouped by epoch. For example, each of the one or more instances of probe information/data and/or sequences may be assigned to and/or grouped into an epoch. For example, the network apparatus 10 may group the instances of probe information/data and/or sequences into epochs. For example, the network apparatus 10 may comprise means, such as the processor 12, memory 14, and/or the like, for grouping the instances of probe information/data and/or sequences into epochs. In an example embodiment, an epoch is a particular period of time or predefined window of time. For example, a week or other period of time (e.g., month, day, and/or the like) may be divided epochs. For example, a week or other period of time may be divided into a plurality of time windows that are each 10 minutes, 15 minutes, 20 minutes, 30 minutes, and/or the like long. For example, a first epoch may be defined from 12:01 AM on Monday to 12:15 AM on Monday and a second epoch may be defined from 12:16 AM on Monday to 12:30 AM on Monday, and/or the like. In various embodiments, each epoch is associated with an epoch identifier configured to uniquely identify that epoch and/or the predefined window of time. In an example embodiment, the timestamp of an instance of probe information/data is used to assign and/or group the instance of probe information/data into an epoch. In an example embodiment, based on a timestamp corresponding to at least one instance of probe information/data of a sequence, the sequence is assigned to and/or grouped into an epoch. For example, the timestamp corresponding to the first instance of probe information/data of the sequence with a location corresponding to the first segment, the last instance of probe information/data of the sequence with a location corresponding to the first segment, the first instance of probe information/data of the sequence with a location corresponding to the subsequent second segment, and/or the like, may be used to assign a sequence to and/or group a sequence into an epoch.

At block 606, a distribution of parameters for an epoch and corresponding to the first segment is determined. For example, parameters corresponding to the first segment are extracted from the instances of probe information/data and/or sequences assigned to the epoch. The distribution of parameters is then analyzed to determine whether the parameter distribution is multimodal or not. For example, epochs having a multimodal parameter distribution may be identified. For example, the network apparatus 10 may analyze the distribution of parameters corresponding to an epoch to determine whether or not the distribution of parameters corresponding to the epoch is multimodal or not and identify epochs having distributions of parameters that are multimodal. For example, the network apparatus 10 may comprise means, such as the processor 12, memory 14, and/or the like, for analyzing the distribution of parameters corresponding to an epoch to determine whether or not the distribution of parameters corresponding to the epoch is multimodal or not and identifying epochs having distributions of parameters that are multimodal. When a distribution of parameters is multimodal, the distribution comprises two or more clusters or modes of parameters, with each parameter corresponding to an instance of probe information/data or a sequence.

When it is determined that the distribution of parameters corresponding to a particular epoch is multimodal, the distribution of parameters for the particular epoch is further analyzed to determine representative parameters for each mode or cluster of the distribution of parameters, at block 608. For example, the network apparatus 10 may analyze the distribution of parameters for a particular epoch that was identified as having a multimodal distribution of parameters to identify representative parameters for each cluster or mode. For example, a representative parameter corresponding to a particular cluster or mode and a particular epoch may be determined by averaging and/or otherwise analyzing the parameters corresponding to a particular cluster or mode of the distribution of parameters. For example, the distribution of parameters may then be analyzed (e.g., summed, averaged, fit with one or more distribution models, and/or the like) to determine one or more representative parameters corresponding to the particular cluster or mode corresponding to the first segment and particular epoch. For example an average (e.g., mean, median, or mode) speed of travel along the first segment, along a portion of the first segment, and/or at a particular point along the first segment may be determined for each cluster or mode of the distribution of parameters. In an example embodiment, the one or more parameters may comprise travel speed, a travel speed to free flow speed ratio, a travel time for traversing the first segment, and/or the like. In an example embodiment, the one or more representative parameters include a number of instances of probe information/data or sequences corresponding to the particular epoch and the particular cluster or mode, a rate of vehicles (e.g., average number of vehicles per minute during the particular epoch) corresponding to the particular cluster or mode, and/or other indication of the volume of traffic and/or number of vehicles traveling along the first segment and corresponding the particular cluster or mode.

At block 610, a divergent parameter pattern is generated, updated, and/or the like. In various embodiments, a divergent parameter pattern is an information/data artifact, data structure, and/or object that indicates one or more representative parameters corresponding to one or more clusters of traffic traversing a first segment. In an example embodiment, a divergent parameter pattern is stored as a table; a flat data file; an annotated data file; as part of a binary large object, virtual table, and/or the like.

For example, the network apparatus 10 may generate and/or update a divergent parameter pattern. For example, the network apparatus 10 may comprise means, such as the processor 12, memory 14, and/or the like for generating and/or updating a divergent parameter pattern. For example, a new entry may be added to the divergent parameter pattern and/or an existing entry of the divergent parameter pattern may be modified. In an example embodiment, the divergent parameter pattern may correspond to only one first segment. In an example embodiment, the divergent parameter pattern may correspond to a plurality of first segments located in a geographic area. For example, a divergent parameter pattern may comprise information/data corresponding to each first segment and/or a plurality of first segments in a tile of a digital map, in a city/town, in a county, in a state/province, in a country, and/or other geographic area. The divergent parameter pattern may then be stored in a geographic database, in a layer of a digital map, used to update a divergent parameter pattern stored in a geographic database and/or a layer of a digital map, and/or the like. For example, a divergent parameter pattern that corresponds to one first segment may be added to and/or linked to a corresponding link record of a geographic database and/or digital map. For example, one or more portions, entries, rows, and/or the like of a divergent parameter pattern that corresponds to a plurality of first segments may be linked to a corresponding link record of a geographic database and/or digital map. In an example embodiment, the linking is performed via the inclusion of a link identifier that corresponds to the link entry corresponding to the first segment in the metadata, portions, entries, rows, and/or the like of the divergent parameter pattern.

FIG. 7 illustrates a format of an example divergent parameter pattern 700, according to an example embodiment. For example, the divergent parameter pattern 700 may be a table comprising a row corresponding to each epoch. For example, each row may corresponding to an epoch and a first segment. In an example embodiment the divergent parameter pattern 700 table comprises a column that is populated with a timestamp and/or epoch identifier for identifying the epoch corresponding to each row of the table. In an example embodiment, the divergent parameter pattern 700 table comprises a column that is populated with a segment identifier (e.g., segment ID) identifying the first segment corresponding to each row of the table. In an example embodiment, the segment ID may be provided as a string and/or may be used to link and/or identify a corresponding link record to that row of the table. In an example embodiment, the divergent parameter pattern 700 table comprises a column that is populated with a cluster number (e.g., the number of clusters and/or modes identified for the first segment during the corresponding epoch). For example, the cluster number may be provided as an integer. In the illustrated embodiment, the divergent parameter pattern 700 table comprises the representative parameters of representative speed (e.g., mean, median, or mode travel speed) for each cluster, a probe count (e.g., number of sequences and/or instances of probe information/data having a unique apparatus identifier corresponding to the particular epoch), a range of travel speeds of the distribution of travel speeds (e.g., a minimum speed and a maximum speed of the distribution, the width of the distribution found by subtracting the minimum speed of the distribution from the maximum speed of the distribution, and/or the like), and a standard deviation of the distribution of travel speeds. The representative speed, range, and standard deviation may be determined (e.g., at block 608) based on the distribution of travel speeds corresponding to and/or extracted from the instances of probe information/data and/or sequences corresponding to the particular epoch. For example, the representative speeds of each cluster and/or mode may be found by identifying the peaks of the multimode distribution, by dividing the instances of probe information/data and/or sequences into clusters based on travel speed and determining an average travel speed for each cluster, and/or the like. In an example embodiment, the travel speed corresponding to and/or extracted from a sequence is a travel speed corresponding to the speed of the vehicle apparatus 20 that captured the instances of probe information/data and/or the corresponding vehicle 5 at a particular point along the first segment, an average travel speed of the vehicle apparatus 20 and/or corresponding vehicle 5 along at least a portion of the first segment, and/or other travel speed corresponding the vehicle apparatus 20 and/or the corresponding vehicle 5 traveling along the first segment, as determined based on the corresponding instance(s) of probe information/data and/or sequence. In an example embodiment, the representative speed is provided as a list of floats with each entry in the list corresponding to one of the clusters and/or modes and the standard deviation of speed and the range are provided as floats. The probe count may be a number of unique apparatus identifiers (coupled with date and/or time of the time stamp) of the instances of probe information/data and/or sequences of each cluster or mode and/or analyzed to determine the representative parameter for a cluster or mode corresponding to the particular epoch. In an example embodiment, the instances of probe information/data and/or sequences may correspond to multiple days, weeks, or months' worth of probe information/data. For example, if an epoch is defined a particular time window of a week, a probe information/data from a plurality of weeks may be combined to determine the representative parameters for the epoch. The probe count may then be determined by dividing the total number of unique apparatus identifiers (coupled with date and/or time of the time stamp) and/or sequences corresponding to the particular cluster and/or mode and the particular epoch divided by the number of weeks' worth of probe information/data that was combined. In an example embodiment, the unique apparatus identifiers are unique for a particular date. For example, if a vehicle apparatus 20 traversed the first segment during a particular epoch on week and then traversed the first segment during the particular epoch the next week, the two traversals of the first segment by the vehicle apparatus 20 would count as two different unique vehicle identifiers. In an example embodiment, the probe count may be provided as a list of integers with each entry in the list corresponding to one of the clusters and/or modes.

Once the geographic database and/or one or more tiles of the digital map have been updated to include the divergent parameter pattern, and/or an updated version of the divergent parameter pattern, the geographic database and/or one or more tiles of the digital map may be provided to one or more vehicle apparatuses 20. There may or may not be overlap between the one or more vehicle apparatuses 20 that provided instances of probe information/data and that receive the geographic database and/or one or more tiles of the digital map comprising the divergent parameter pattern, in various embodiments. For example, the network apparatus 10 may update the geographic database and/or one or more tiles of the digital map and/or provide the geographic database and/or one or more tiles of the digital map to one or more vehicle apparatuses 20. For example, the network apparatus 10 may comprise means, such as processor 12, memory 14, communications interface 16, and/or the like for updating the geographic database and/or one or more tiles of the digital map and/or providing the geographic database and/or one or more tiles of the digital map to one or more vehicle apparatuses 20.

In various embodiments, a vehicle apparatus 20 (e.g., onboard and/or coupled to a vehicle 5) may use one or more divergent parameter patterns of the geographic database and/or digital map to perform one or more navigation functions. In various embodiments, the divergent parameter pattern(s) may be used (e.g., e.g., by a navigation application operating on the vehicle apparatus and/or network apparatus) to predict lane-level traffic conditions, lane-level traffic information/data, lane-level travel times, and/or the like. In various embodiments, the prediction(s) may be performed to determine a future lane-level traffic conditions, lane-level traffic information/data, lane-level travel times, and/or the like; estimate a current lane-level traffic conditions, lane-level traffic information/data, lane-level travel times, and/or the like when real-time information/data is not available due to lack of network connection/bandwidth and/or an insufficient number of probe apparatuses reporting real-time information/data for the subject road segments. These predictions may then be used (e.g., by the vehicle apparatus 20 and/or the network apparatus 10) to perform one or more navigation functions, such as localization, route determination, lane level route determination, route travel time determination, lane maintenance, route guidance, lane level route guidance, provision of traffic information/data, provision of lane level traffic information/data, and/or the like.

FIG. 8 provides pseudocode that may be executed (e.g., by the network apparatus 10) for identifying the number of clusters or modes in the instances of probe information/data and/or sequences corresponding to a particular epoch (similar to block 606) and determining representative parameters for each identified cluster or mode (similar to block 608). Starting at line 1, a list of parameters V is defined, read in, and/or the like. For example, the list of parameters V comprises a parameter P (e.g., travel speed and/or the like) for each unique apparatus identifier (coupled to the date and/or time of the timestamp) and/or sequence corresponding to the particular epoch. In an example embodiment, the list of parameters comprises an ordered list of parameters V such that the parameters P are ordered from smallest to largest or largest to smallest within the list of parameters V. Line 2 calls a function for identifying clusters or modes in the list of parameters V and determining representative parameters for the identified clusters or modes. Line 3 determines the standard deviation of the list of parameters V and line 4 determines the mean of the list of parameters V. For example, the standard deviation and mean of the parameters P may be determined. Line 5 filters outliers from the list of parameters V. For example, any parameters P that are outside of a range defined by a selected and/or predefined multiple of the standard deviation of the list of parameters V from the mean of the list of parameters V may be filtered out from the list of parameters V. Line 6 determines the bin range D, wherein the bin range D is the range of parameters P for each bin. The bin range D is found by dividing the range of parameters P in the list of parameters V (e.g., the value found by subtracting the minimum parameter $P_{min}$ from the maximum parameter $P_{max}$) by the number of bins BIN_NUMBER to be used, in the illustrated embodiment. In an example embodiment, the number of bins BIN_NUMBER is 16, though other values may be used in various other embodiments.

Lines 7-10 define bins $B_1$ to $B_{BIN\_NUMBER}$ and populates each bin with the consecutive entries of the list of parameters V with the range defined by the bin range D. For example, all of the parameters P of the list of parameters V within the range of the maximum parameter $P_{max}$ and the maximum parameter minus the bin range (e.g., $P_{max}-1*D$) are bucketed or binned into the first bin $B_1$. The second bin $B_2$ would then comprise all of the parameters P of the list of parameters V within the range of $P_{max}-1*D$ and $P_{max}-2*D$, and so on such that $B_{BIN\_NUMBER}$ comprises the parameters P of the list of parameters V within the range of the minimum parameter $P_{min}$ and $P_{max}-(BIN\_NUMBER-1)*D$. As should be understood, in an example embodiment, the first bin $B_1$ could be defined as all of the parameters P of the list of parameters V within the range of the minimum parameter $P_{min}$ and the minimum parameter plus the bin range (e.g., $P_{min}+1*D$).

Line 11 restores the list of parameters V and line 12 initiates the number of clusters C or modes with a value of 1. Lines 13-23 identify the number of clusters C and representative parameters for each cluster. For example, a measure of grouping MG is determined. In an example embodiment, the measure of grouping MG is the difference between the average value of the parameters P in the first bin $B_1$ and the average value of the parameters P in an investigated and/or selected bin $B_i$ divided by the range of the list of parameters V. If the measure of grouping MG is greater than a predefined grouping value T; the number of parameters in the first bin $B_1$ is greater than a first minimum number $N_1$; and/or the number of parameters in the investigated and/or selected bin $B_i$ is greater than a second minimum number $N_2$, then the parameters P of the first bin $B_1$ and the parameters P of the investigated and/or selected bin $B_i$ are determined to belong to different clusters and/or modes. In such an instance, the number of clusters C is updated to reflect that another cluster or mode has been identified and representative parameters for the first cluster or mode (e.g., the cluster or mode represented by the parameters P of the first bin $B_1$) are determined. The process is then repeated with the investigated and/or selected bin $B_i$ taking the place of the first bin $B_1$ and a new investigated and/or selected bin $B_{i+1}$. If the measure of grouping MG is not greater than a predefined grouping value T and/or the number of parameters in the first bin $B_1$ is not greater than a first minimum number $N_1$ and/or the number of parameters in the investigated and/or selected bin $B_i$ is not greater than a second minimum number $N_2$, then the parameters P of the first bin $B_1$ and the parameters P of the investigated and/or selected bin $B_i$ are determined to belong to the same cluster and/or mode. In such a case, the parameters P of the investigated and/or selected bin $B_i$ are added to the first bin $B_1$ and the process is repeated with a new investigated and/or selected bin $B_{i+1}$ without adjusting the number of identified clusters and/or modes C. The process repeats until all of the bins have been considered.

Lines 24-27 cause the function to provide and/or return the number of clusters or modes, the average (e.g., mean)

parameter for each cluster or mode, the size of each cluster or mode (e.g., the number of parameters P in the bin corresponding to cluster or mode), and the standard deviation for the parameters P of each cluster or mode. As should be understood, FIG. 8 provides pseudocode for one example technique for identifying the number of clusters and/or modes for a parameter corresponding to a first segment and an epoch and determining representative parameters for the identified clusters and/or modes that may be executed by the network apparatus 10 to perform and/or achieve blocks 606 and 608, in accordance with an example embodiment. However, various other techniques for performing and/or achieving blocks 606 and 608 may be used in various embodiments.

Lane Event Pattern

In various embodiments, a lane event pattern is an information/data artifact, data structure, and/or object that provides information regarding lane-level traffic events. In an example embodiment, a lane event pattern is generated by reviewing and/or analyzing the audit logs generated by real-time processing of probe information/data by one or more lane-level real-time traffic engines. For example, lane-level real-time traffic engines may be configured to analyze real-time or near real-time probe information/data to identify and/or determine real-time lane-level traffic conditions. The real-time lane-level traffic engines may generate and/or output one or more audit logs. In an example embodiment, an audit log may comprise event information/data regarding identified traffic events. For example, the lane-level real-time traffic engine may identify portions of a lane-level road network that are experiencing sub-optimal traffic flow as traffic events and determine and/or generate event information/data corresponding to the identified traffic events. The event information/data is then provided in the audit log. In an example embodiment, a sub-optimal traffic flow is a traffic flow where the ratio of the real-time travel speed $s_{rt}$ to the free flow speed $s_{ff}$ for the lane and/or road segment is less than a threshold value TV (e.g., $s_{rt}/s_{ff}<TV$). In various embodiments, the threshold value TV is predefined. For example, the threshold value may be 1, 0.95, 0.9, 0.85, 0.8, 0.75, 0.7, and/or the like, in various embodiments.

The free flow speed $s_{ff}$ may be specific to the lane and/or road segment and may be determined and/or accessed from a corresponding link record, lane-level link record, and/or the like. For example, if a particular road segment has a speed limit, the free flow speed may be the speed limit. In another example, the free flow speed for a road segment may be an expected speed along the road segment (e.g., which may be based on certain conditions such as the type of road, time of day, day of the week, weather conditions, and/or the like). For example, the free flow speed for a segment of a particular road under certain conditions may be 30 mph even through the speed limit for the road segment is 45 mph. In another example, the free flow speed for a segment of a particular road under certain conditions may be 70 mph even through the speed limit of the road segment is 60 mph.

In various embodiments, the event information/data may comprise a segment and/or lane identifier configured to uniquely identify the road segment or lane experiencing the traffic event, a timestamp identifying the date and/or time at which the traffic event is detected by the lane-level real-time traffic engine (and/or a timestamp determined based on the timestamps of one or more instances of probe information/data used to identify the traffic event), an epoch identifier configured to identify the epoch and/or predefined time window during which the traffic event occurred, one or more representative parameters corresponding to the traffic event, and/or the like. For example, the one or more representative parameters corresponding to the traffic event may comprise a representative speed (e.g., mean, median, or mode travel speed determined from instances of probe information/data used to identify the traffic event), a number of probe counts (e.g., the number of instances of probe information/data and/or unique apparatus identifiers corresponding to the instances of probe information/data used to identify the traffic event), a free flow ratio, a standard deviation of travel speeds, a range of travel speeds, and/or the like corresponding to the traffic event.

In various embodiments, the audit logs (and the event information/data contained therein) may be analyzed to determine if one or more traffic events are recurring. For example, if a traffic event was identified for a first segment between 5:00 pm and 5:15 pm on three Mondays out of four, it may be determined that the first segment tends to experience a traffic event between 5:00 and 5:15 pm on Mondays. In an example embodiment, the audit logs and/or event information/data may be analyzed by one or more predictive algorithms to identify recurring traffic events. In an example embodiment, the one or more predictive algorithms may comprise a neural network, deep net, and/or the like trained via machine learning. The one or more predictive algorithms may then provide recurring event information/data that may then incorporated into a lane event pattern.

In various embodiments, the event information/data and/or recurring event information/data determined therefrom corresponds to an epoch. In an example embodiment, an epoch is a particular period of time or predefined window of time. For example, a week or other period of time (e.g., month, day, and/or the like) may be divided epochs. For example, a week or other period of time may be divided into a plurality of time windows that are each 10 minutes, 15 minutes, 20 minutes, 30 minutes, and/or the like long. For example, a first epoch may be defined from 12:01 AM on Monday to 12:15 AM on Monday and a second epoch may be defined from 12:16 AM on Monday to 12:30 AM on Monday, and/or the like. In various embodiments, each epoch is associated with an epoch identifier configured to uniquely identify that epoch and/or the predefined window of time.

FIG. 9 provides a flowchart illustrating various processes, procedures, operations, and/or the like that may be performed, for example by the network apparatus 10, in various embodiments, to generate, determine, and/or update a lane event pattern. Starting at block 902, one or more audit logs and/or corresponding event information/data are received. For example, the network apparatus 10 and/or another computing entity operating a lane-level real-time traffic engine may receive one or more instances of probe information/data and, using the lane-level real-time traffic engine, process and/or analyze the instances of probe information/data to identify traffic events and to generate and/or provide audit logs comprising event information/data corresponding to the identified traffic events. In an example embodiment, each instance of probe information/data is captured, generated, determined and/or the like and provided by a vehicle apparatus 20 as the vehicle 5 the vehicle apparatus 20 is onboard and/or coupled to traverses a portion of a road network comprising a first segment. The network apparatus 10 may then access the audit logs and/or read or extract event information/data therefrom. For example, the network apparatus 10 may comprise means, such as processor 12, memory 14, communications interface 16, and/or the like, for accessing one or more audit logs and/or read or extract event information/data from the one or more audit logs. For example, the audit logs may be stored in a data stored and accessed therefrom.

In various embodiments, the event information/data may comprise a segment and/or lane identifier configured to uniquely identify the road segment or lane experiencing the traffic event (e.g., the first segment), a timestamp identifying the date and/or time at which the traffic event was detected by the lane-level real-time traffic engine (and/or a timestamp determined based on the timestamps of one or more instances of probe information/data used to identify the traffic event), an epoch identifier configured to identify the epoch and/or predefined time window during which the traffic event occurred, one or more parameters corresponding to the traffic event, and/or the like. For example, the one or more parameters corresponding to the traffic event may comprise a representative speed (e.g., mean, median, or mode travel speed determined from instances of probe information/data used to identify the traffic event), a number of probe counts (e.g., the number of instances of probe information/data and/or unique apparatus identifiers corresponding to the instances of probe information/data used to identify the traffic event), a free flow ratio, a standard deviation of travel speeds, a range of travel speeds, and/or the like corresponding to the traffic event.

At block 904, the one or more instances of event information/data are grouped by epoch. For example, each of the one or more instances of event information/data may be assigned to and/or grouped into an epoch. For example, the network apparatus 10 may group the instances of event information/data into epochs. For example, the network apparatus 10 may comprise means, such as the processor 12, memory 14, and/or the like, for grouping the instances of event information/data into epochs. In an example embodiment, an epoch is a particular period of time or predefined window of time. For example, a week or other period of time (e.g., month, day, and/or the like) may be divided epochs. For example, a week or other period of time may be divided into a plurality of time windows that are each 10 minutes, 15 minutes, 20 minutes, 30 minutes, and/or the like long. For example, a first epoch may be defined from 12:01 AM on Monday to 12:15 AM on Monday and a second epoch may be defined from 12:16 AM on Monday to 12:30 AM on Monday, and/or the like. In various embodiments, each epoch is associated with an epoch identifier configured to uniquely identify that epoch and/or the predefined window of time. In an example embodiment, the timestamp of an instance of event information/data is used to assign and/or group the instance of event information/data into an epoch.

At block 906, recurring events are identified and/or determined. For example, parameters corresponding to the event information/data corresponding to a first segment and assigned to a particular epoch may be processed and/or analyzed to identify and/or determine whether any recurring events exist for the first segment during the particular epoch. For example, the network apparatus 10 may process and/or analyze the event information/data corresponding to a first segment during an epoch to determine whether or not a recurring event tends to occur on the first segment during the epoch. For example, the network apparatus 10 may comprise means, such as the processor 12, memory 14, and/or the like, for processing and/or analyzing the event information/data corresponding to a first segment during an epoch to determine whether or not a recurring event tends to occur on the first segment during the epoch.

For example, the event information/data corresponding to the first segment and the particular epoch may be analyzed by one or more predictive algorithms to identify recurring traffic events corresponding to the first segment and the particular epoch and/or determine whether a recurring event tends to occur on the first segment during the particular epoch. In an example embodiment, the one or more predictive algorithms may comprise a neural network, deep net, and/or the like trained via machine learning. The one or more predictive algorithms may then provide recurring event information/data.

When a recurring event is identified for the first segment and a particular epoch, recurring event information/data is determined, at block 908. For example, the network apparatus 10 may analyze the event information/data corresponding to the identified recurring event to determine recurring event information/data corresponding to the recurring event. For example, one or more representative parameters corresponding to the recurring event may be determined. For example, the event information/data corresponding to the traffic events that corresponding to the recurring event may then be analyzed (e.g., summed, averaged, fit with one or more distribution models, and/or the like) to determine one or more representative parameters corresponding to the recurring event for the first segment and particular epoch. For example, an average (e.g., mean, median, or mode) speed of travel along the first segment, along a portion of the first segment, and/or at a particular point along the first segment, a travel speed to free flow speed ratio for the first segment, travel time for traversing the first segment, and/or the like may be determined for each identified recurring event based on the event information/data from which the recurring event was identified. In an example embodiment, the one or more representative parameters include a number of instances of event information/data corresponding to the particular epoch and the particular recurring event, a rate of vehicles (e.g., average number of vehicles per minute during the particular epoch) corresponding to the particular recurring event, and/or other indication of the volume of traffic and/or number of vehicles traveling along the first segment and corresponding the particular recurring event.

At block 910, a lane event pattern is generated, updated, and/or the like. In various embodiments, a divergent parameter pattern is an information/data artifact, data structure, and/or object that indicates one or more representative parameters corresponding to one or more recurring events for a first segment. In an example embodiment, a lane event pattern is stored as a table; a flat data file; an annotated data file; as part of a binary large object, virtual table, and/or the like.

For example, the network apparatus 10 may generate and/or update a lane event pattern. For example, the network apparatus 10 may comprise means, such as the processor 12, memory 14, and/or the like for generating and/or updating a lane event pattern. For example, a new entry may be added to the lane event pattern to add a new recurring event to the lane event pattern and/or an existing entry of the lane event pattern may be modified to update representative parameters of a recurring event. In an example embodiment, the lane event pattern may correspond to only one first segment. In an example embodiment, the lane event pattern may correspond to a plurality of first segments located in a geographic area. For example, a lane event pattern may comprise information/data corresponding to each first segment and/or a plurality of first segments in a tile of a digital map, in a city/town, in a county, in a state/province, in a country, and/or other geographic area. The lane event pattern may then be stored in a geographic database, in a layer of a digital map, used to update a lane event pattern stored in a geographic database and/or a layer of a digital map, and/or the like. For example, a lane event pattern that corresponds to one first segment may be added to and/or linked to a corresponding link record of a geographic database and/or digital map. For example, one or more portions, entries, rows, and/or the like of a lane event pattern that corresponds to a plurality of first segments may be linked to a corresponding link record of a geographic database and/or digital map. In an example embodiment, the linking is performed via the inclusion of a link identifier that corresponds to the link entry corresponding to the first segment in the metadata, portions, entries, rows, and/or the like of the divergent parameter pattern.

Once the geographic database and/or one or more tiles of the digital map have been updated to include the lane event pattern, and/or an updated version of the lane event pattern, the geographic database and/or one or more tiles of the digital map may be provided to one or more vehicle apparatuses 20. There may or may not be overlap between the one or more vehicle apparatuses 20 that provided instances of probe information/data and that receive the geographic database and/or one or more tiles of the digital map comprising the lane event pattern, in various embodiments. For example, the network apparatus 10 may update the geographic database and/or one or more tiles of the digital map and/or provide the geographic database and/or one or more tiles of the digital map to one or more vehicle apparatuses 20. For example, the network apparatus 10 may comprise means, such as processor 12, memory 14, communications interface 16, and/or the like for updating the geographic database and/or one or more tiles of the digital map and/or providing the geographic database and/or one or more tiles of the digital map to one or more vehicle apparatuses 20.

In various embodiments, a vehicle apparatus 20 (e.g., onboard and/or coupled to a vehicle 5) may use one or more lane event patterns of the geographic database and/or digital map to perform one or more navigation functions. In various embodiments, the lane event pattern(s) may be used (e.g., by a navigation application operating on the vehicle apparatus and/or network apparatus) to predict lane-level traffic conditions, lane-level traffic information/data, lane-level travel times, and/or the like. In various embodiments, the prediction(s) may be performed to determine a future lane-level traffic conditions, lane-level traffic information/data, lane-level travel times, and/or the like; estimate a current lane-level traffic conditions, lane-level traffic information/data, lane-level travel times, and/or the like when real-time information/data is not available due to lack of network connection/bandwidth and/or an insufficient number of probe apparatuses reporting real-time information/data for the subject road segments. These predictions may then be used (e.g., by a navigation application operating on the vehicle apparatus and/or network apparatus) to perform one or more navigation functions, such as localization, route determination, lane level route determination, route travel time determination, lane maintenance, route guidance, lane level route guidance, provision of traffic information/data, provision of lane level traffic information/data, and/or the like. In various embodiments, one or more lane event patterns may be used to update, fine tune, and/or improve a lane-level real-time traffic engine.

Generating and Providing (Near) Real-Time Traffic Information/Data

In various embodiments, pattern information/data is used to predict (near) real-time and/or future traffic information/data. The traffic information/data generated and/or provided is lane-level traffic information/data in various embodiments. For example, the traffic information/data may be lane-level traffic conditions, lane-level traffic information/data, lane-level travel times, and/or the like. As used herein, pattern information/data is information/data extracted from one or more lane direction patterns, divergent parameter patterns, and/or lane event patterns. In various embodiments, the network apparatus 10 may provide the predicted (near) real-time and/or future traffic information/data to a vehicle apparatus 20. In an example embodiment, (near) real-time and/or future traffic information/data may be generated by a vehicle apparatus 20 based on one or more lane direction patterns, divergent parameter patterns, and/or lane event patterns of a geographic database and/or one or more map tiles stored by the vehicle apparatus 20 (e.g., in memory 24). The predicted (near) real-time and/or future traffic information/data may then be used by the network apparatus 10 and/or vehicle apparatus 20 to perform one or more navigation functions. Some non-limiting examples of navigation functions localization, route determination, lane level route determination, route travel time determination, lane maintenance, route guidance, lane level route guidance, provision of traffic information/data, provision of lane level traffic information/data, and/or the like.

FIG. 10 provides a flowchart illustrating an example process of generating and providing (near) real-time and/or future traffic information/data that may be performed, for example, by a network apparatus 10. The (near) real-time and/or future traffic information/data is generated based on pattern information/data extracted from one or more lane direction patterns, divergent parameter patterns, and/or lane event patterns. Starting at block 1002, (near) real-time probe information/data is received. For example, the network apparatus 10 may receive (near) real-time probe information/data. For example, the network apparatus 10 may comprise means, such as processor 12, memory 14, communications interface 18, and/or the like, for receiving a plurality of instances of (near) real-time probe information/data. In various embodiments, the (near) real-time probe information/data is captured, generated, and/or the like by one or more vehicle apparatuses 20 (e.g., via one or more sensors 29). For example, one or more vehicle apparatuses 20 may capture, generate, and/or the like (near) real-time probe information/data and transmit the (near) real-time probe information/data such that the network apparatus 10 receives the (near) real-time probe information/data. In an example embodiment, an instance of the (near) real-time probe information/data comprises a location at which the instance of probe information/data was captured as determined by one or more location sensors of the vehicle apparatus, a timestamp indicating the date and/or time at which the instance of probe information/data was captured, an apparatus identifier configured to uniquely identify the vehicle apparatus 20 that captured the instance of probe information/data, and/or the like. In various embodiments, an instance of probe information/data may comprise various other parameters and/or sensor information/data captured by any combination of the one or more sensors 29.

At block 1004, the received instances of (near) real-time probe information/data are map-matched and current traffic condition information/data is extracted therefrom. For example, the network apparatus 10 may map-match the received instances of (near) real-time probe information/data and extract current traffic condition information/data from the map-matched instances of (near) real-time probe information/data. For example, one or more instances of received (near) real-time probe information/data may be map-matched to a first segment and current traffic condition information/data may be extracted from those one or more instances of (near) real-time probe information/data. For example, the network apparatus 10 may comprise means, such as processor 12, memory 14, and/or the like for map-matching the received instances of (near) real-time probe information/data and extracting current traffic condition information/data from the map-matched instances of (near) real-time probe information/data.

At block 1006, pattern information/data is extracted from one or more lane direction patterns, divergent parameter patterns, and/or lane event patterns. For example, based on the epoch corresponding to the timeframe (e.g., (near) real-time or future) for which the traffic information/data is to be generated, pattern information/data is extracted from one or more lane direction patterns, divergent parameters patterns, and/or lane event patterns corresponding to the first segment (e.g., using the segment identifier corresponding to and/or associated with the first segment). For example, the timeframe for which the traffic information/data is to be generated may depend on the navigation function to be performed. For example, if the navigation function to be performed is lane-level route determination, the timeframe corresponding to the first segment may be a time and/or time window at which the vehicle apparatus 20 and/or corresponding vehicle 5/user is expected to reach the first segment according to lane-level route that is being determined. In an example embodiment, the network apparatus 10 may access one or more lane direction patterns, divergent parameter patterns, and/or lane event patterns from a geographic database and/or one or more tiles of a digital map and extract pattern information/data therefrom. For example, the network apparatus 10 may comprise means, such as the processor 12, memory 14, and/or the like, for accessing one or more lane direction patterns, divergent parameter patterns, and/or lane event patterns from a geographic database and/or one or more tiles of a digital map (e.g., stored in the memory 14) and extracting pattern information/data therefrom (e.g., based on a segment identifier corresponding to the first segment and an epoch corresponding to the time frame for which the traffic information/data is to be generated).

At block 1008, one or more real-time traffic algorithms are used to analyze the (near) real-time probe information/data (e.g., the extracted current traffic condition information/data) and the pattern information/data to generate, predict, determine, and/or the like (near) real-time and/or future traffic information/data. For example, the network apparatus 10 may use one or more real-time traffic algorithms to analyze the (near) real-time probe information/data and the pattern information/data to generate, predict, determine, and/or the like the (near) real-time and/or future traffic information/data. For example, the network apparatus 10 comprises means, such as the processor 12, memory 14, and/or the like for using one or more real-time traffic algorithms to analyze the (near) real-time probe information/data and the pattern information/data to generate, predict, determine, and/or the like the (near) real-time and/or future traffic information/data. In an example embodiment, at least one of the one or more real-time traffic algorithms is a model, deep net, neural network, and/or the like that has been trained using machine learning. In an example embodiment, at least one of the one or more real-time traffic algorithms is configured and/or programmed to generate, predict, and/or determine current (e.g., (near) real-time) and/or future traffic information/data based on determining portions of the pattern information/data that are relevant to the current condition of the first segment (e.g., if an observed pattern is being experienced), the one or more representative parameters of a lane direction pattern for a first segment that are relevant to a route based on a second segment corresponding to the route, an expected mode of one or more lanes of a first segment based on a divergent parameter pattern, and/or the like. Thus, based on the (near) real-time probe information/data (e.g., extracted current traffic condition information/data) corresponding to a first segment and pattern information/data for a first segment, (near) real-time and/or future traffic information/data for a first segment may be generated, predicted, and/or determined.

At block 1010, the (near) real-time and/or future traffic information/data is provided and/or used to perform one or more navigation functions. For example, the network apparatus 10 may provide the (near) real-time and/or future traffic information/data corresponding to one or more first segments to one or more vehicle apparatuses 20 for use in completing one or more navigation functions. For example, the network apparatus 10 may comprise means, such as processor 12, memory 14, communications interface 18, and/or the like, for providing the (near) real-time and/or future traffic information/data corresponding to one or more first segments to one or more vehicle apparatuses 20 for use in completing one or more navigation functions. In an example embodiment, the network apparatus 10 may use the (near) real-time and/or future traffic information/data corresponding to one or more first segments complete one or more navigation functions and may transmit and/or provide a result of the one or more navigation functions to one or more vehicle apparatuses 20. For example, the network apparatus 10 may comprise means, such as processor 12, memory 14, communications interface 18, and/or the like, for using the (near) real-time and/or future traffic information/data corresponding to one or more first segments complete one or more navigation functions and may transmitting and/or providing a result of the one or more navigation functions to one or more vehicle apparatuses 20. For example, based on the (near) real-time and/or future traffic information/data generated, predicted, and/or determined for one or more first segments, a lane level route may be determined and/or an estimated travel time for traversing a lane level route may be determined.

Technical Advantages

Various embodiments of the present invention provide methods, apparatuses, systems, computer program products, and/or the like for determining and/or generating lane direction patterns, divergent parameter patterns, and/or lane event patterns for one or more road segments of a road network; incorporating the lane direction patterns, divergent parameter patterns, and/or lane event patterns into a digital map and/or geographic database; and providing at least a portion of the digital map and/or geographic database to a vehicle apparatus (e.g., onboard and/or coupled to a vehicle) such that the lane direction patterns, divergent parameter patterns, and/or lane event patterns may be used (e.g., by a navigation application operating on the vehicle apparatus and/or network apparatus) to perform one or more navigation functions. In various embodiments, the lane direction patterns, divergent parameter patterns, and/or lane event patterns may be used (e.g., by the vehicle apparatus and/or a network apparatus) to predict lane-level traffic conditions, lane-level traffic information/data, lane-level travel times, and/or the like. In various embodiments, the prediction(s) may be performed to determine a future lane-level traffic conditions, lane-level traffic information/data, lane-level travel times, and/or the like; estimate a current lane-level traffic conditions, lane-level traffic information/data, lane-level travel times, and/or the like when real-time information/data is not available due to lack of network connection/bandwidth and/or an insufficient number of probe apparatuses reporting real-time information/data for the subject road segments. These predictions may then be used (e.g., by a navigation application operating on the vehicle apparatus and/or network apparatus) to perform one or more navigation functions, such as localization, route determination, lane level route determination, route travel time determination, lane maintenance, route guidance, lane level route guidance, provision of traffic information/data, provision of lane level traffic information/data, and/or the like. Thus, there lane direction patterns, divergent parameter patterns, and/or lane event patterns allow for a more accurate determination of current and/or future traffic conditions along various segments of a road network under circumstances when a the traffic conditions cannot be directly determined (e.g., based on real-time probe information/data) while having a minimal effect on the size of a tile of a digital map and/or the geographic database. Therefore, various embodiments of the present invention provide an improvement to navigation and/or routing technologies.

III. Example Apparatus

The network apparatus 10 and/or vehicle apparatus 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10 and/or vehicle apparatus 20 may be embodied in other types of computing devices, such as a server, a personal computer, a computer workstation, a laptop computer, a plurality of networked computing devices or the like, that are configured to determine and/or generate lane direction patterns, divergent parameter patterns, and/or lane event patterns; incorporate lane direction patterns, divergent parameter patterns, and/or lane event patterns into a digital map and/or geographic database; use lane direction patterns, divergent parameter patterns, and/or lane event patterns to perform one or more navigation functions, and/or the like. In an example embodiment, a vehicle apparatus 20 is an in-vehicle navigation system onboard a vehicle 5 or a mobile device and a network apparatus 10 is a server. In this regard, FIG. 2A depicts an example network apparatus 10 and FIG. 2B depicts an example vehicle apparatus 20 that may be embodied by various computing devices including those identified above.

As shown, the network apparatus 10 of an example embodiment may include, may be associated with, or may otherwise be in communication with a processor 12 and a memory device 14 and optionally a communication interface 16 and/or a user interface 18. Similarly, the vehicle apparatus 20 may comprise a processor 22, memory 24, a communications interface 26, a user interface 28, one or more sensors 29 such as one or more location sensors (e.g., a GNSS sensor; IMU sensors; an odometry system, and/or the like) and/or other components configured to perform various operations, procedures, functions or the like described herein. For example, in an example embodiment, a vehicle apparatus 20 may comprise and/or be in communication with one or more sensors such as, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10 and/or vehicle apparatus 20 may be embodied by a computing device and/or computing entity. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor.

Alternatively or additionally, the processor 12, 22 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or vehicle apparatus 20 may include a user interface 18, 28 that may, in turn, be in communication with the processor 12, 22 to provide output to the user, such as one or more instances of map information/data and/or graphical presentations thereof, one or more routes through a road network (e.g., lane-level routes), and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network apparatus 10 and/or vehicle apparatus 20 may further include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/ or other hardware/software for supporting communication via cable, digital subscriber line (DSL), universal serial bus (USB) or other mechanisms.

In addition to embodying the network apparatus 10 and/or vehicle apparatus 20 of an example embodiment, a navigation system may also include or have access to a geographic database that includes a variety of data (e.g., map information/data) utilized in constructing a route or navigation path (e.g., a lane-level route), determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer, or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, travel lane data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to links, lanes of a road segments, nodes, intersection, POIs, and/or the like and/or the corresponding data records, a localization layer (e.g., comprising localization features) and/or the corresponding data records, and/or the like.

In an example embodiment, the road segment data records are links or segments, e.g., maneuvers of a maneuver graph, representing roads, streets, travel lanes of roads and/or streets, or paths, as can be used in the calculated route or recorded route information for determination of one or more personalized routes (e.g., lane-level routes). The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, travel lanes, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include information/data about the POIs and their respective locations in the POI data records. The geographic database can also include data about places, such as cities, towns, or other communities, and other geographic features, such as bodies of water, mountain ranges, etc. Such place or feature data can be part of the POI information/data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records, or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by vehicle apparatuses 20 through the use of update and/or notification messages. In various embodiments, the vehicle apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or vehicle apparatus 20 in accordance with an example embodiment may determine the time to traverse a route that includes one or more turns at respective intersections more accurately.

IV. Apparatus, Methods, and Computer Program Products

As described above, FIGS. 3, 6, and 9 illustrate flowcharts of a network apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving, by a network apparatus comprising a processor, memory, and a communication interface configured to communicate via at least one network, a plurality of sequences of instances of probe data, each sequence (a) comprising a plurality of instances of probe data captured by a vehicle apparatus, the sequence corresponding to a trajectory that was traveled by the vehicle apparatus along a first segment to one of two or more possible subsequent second segments and (b) comprising an indication of at least one parameter characterizing travel of the vehicle apparatus along the first segment;
grouping, by the network apparatus, the plurality of sequences of probe data into two or more groups of sequences of probe data based on a respective subsequent segment of the two or more possible subsequent segments corresponding to the respective sequence of probe data of the plurality of sequences of probe data, each group corresponding to one of the two or more possible subsequent second segments, wherein the respective subsequent segment of the two or more possible subsequent segments corresponding to the respective sequence of probe data is the respective subsequent segment that the respective vehicle apparatus traveled after traveling the first segment;
for the first group of the two or more groups, determining, by the network apparatus, at least one representative parameter corresponding to the first segment based on the at least one parameter of the one or more sequences of the first group; and
modifying, by the network apparatus, at least one element of a data structure with the at least one representative parameter, the at least one element of the data structure corresponding at least a portion of the first segment that corresponds to a maneuver from the first segment to the first subsequent segment, wherein (a) a geographic database comprises the data structure and (b) a navigation application is configured to use at least a portion of the geographic database that comprises the data structure to perform a navigation function.

2. The method of claim 1, wherein the at least one parameter comprises a speed of travel of the vehicle apparatus along at least a portion of the first segment.

3. The method of claim 1, wherein the representative at least one parameter comprises at least one of (a) a mean of the at least one parameter for the sequences of the first group, (b) a median of the at least one parameter for the sequences of the first group, or (c) a standard deviation of the at least one parameter for the sequences of the first group.

4. The method of claim 1, wherein (a) each sequence is associated with a timestamp and (b) each group of the two or more groups corresponds to both (i) a particular second segment of the two or more possible subsequent second segments and (ii) a predefined epoch.

5. The method of claim 4, wherein the predefined epoch corresponds to a predefined time window of a week.

6. The method of claim 5, wherein the predefined time window corresponds to a predefined fifteen minute period of the week.

7. The method of claim 1, wherein the data structure comprises a segment identifier for the first segment.

8. The method of claim 1, wherein at least a portion of the data structure is linked to a link record in the geographic database corresponding to the first segment.

9. The method of claim 1, further comprising:
determining a number of sequences in the first group; and
modifying at least one second element of the data structure with the number of sequences in the first group, the at least one second element corresponding to the first group and the first segment.

10. The method of claim 1, wherein performing the navigation function comprises using at least a portion of the data structure to predict a traffic parameter corresponding to the first segment.

11. An apparatus comprising at least one processor, at least one non-transitory memory storing computer program code, and at least one communications interface configured to communicate via at least one network, the computer program code configured to, when executed by the at least one processor, cause the apparatus to at least:
receive a plurality of sequences of instances of probe data, each sequence (a) comprising a plurality of instances of probe data captured by a vehicle apparatus, the sequence corresponding to a trajectory that was traveled by the vehicle apparatus along a first segment to one of two or more possible subsequent second segments and (b) comprising an indication of at least one parameter characterizing travel of the vehicle apparatus along the first segment;
group the plurality of sequences of probe data into two or more groups of sequences of probe data based on a respective subsequent segment of the two or more possible subsequent segments corresponding to the respective sequence of probe data of the plurality of sequences of probe data, each group corresponding to one of the two or more possible subsequent second segments, wherein the respective subsequent segment of the two or more possible subsequent segments corresponding to the respective sequence of probe data is the respective subsequent segment that the respective vehicle apparatus traveled after traveling the first segment;
for the first group of the two or more groups, determine at least one representative parameter corresponding to the first segment based on the at least one parameter of the one or more sequences of the first group; and
modify at least one element of a data structure with the at least one representative parameter, the at least one element of the data structure corresponding to at least a portion of the first segment that corresponds to a maneuver from the first segment to the first subsequent segment, wherein (a) a geographic database comprises the data structure and (b) a navigation application is configured to use at least a portion of the geographic database that comprises the data structure to perform a navigation function.

12. The apparatus of claim 11, wherein the at least one parameter comprises a speed of travel of the vehicle apparatus along at least a portion of the first segment.

13. The apparatus of claim 11, wherein the representative at least one parameter comprises at least one of (a) a mean of the at least one parameter for the sequences of the first group, (b) a median of the at least one parameter for the sequences of the first group, or (c) a standard deviation of the at least one parameter for the sequences of the first group.

14. The apparatus of claim 11, wherein (a) each sequence is associated with a timestamp and (b) each group of the two or more groups corresponds to both (i) a particular second segment of the two or more possible subsequent segments and (ii) a predefined epoch.

15. The apparatus of claim 14, wherein the predefined epoch corresponds to a predefined time window of a week.

16. The apparatus of claim 11, wherein the data structure comprises a segment identifier for the first segment.

17. The apparatus of claim 11, wherein at least a portion of the data structure is linked to a link record in the geographic database corresponding to the first segment.

18. The apparatus of claim 11, further comprising:
determining a number of sequences in the first group; and
modifying at least one second element of the data structure with the number of sequences in the first group, the at least one second element corresponding to the first group and the first segment.

19. The apparatus of claim 11, wherein performing the navigation function comprises using at least a portion of the data structure to predict a traffic parameter corresponding to the first segment.

20. A computer program product comprising at least one non-transitory computer-readable storage medium having computer-executable program code instructions stored therein with the computer-executable program code instructions comprising program code instructions configured to, when executed by a processor of an apparatus, cause the apparatus to at least:
receive a plurality of sequences of instances of probe data, each sequence (a) comprising a plurality of instances of probe data captured by a vehicle apparatus, the sequence corresponding to a trajectory that was traveled by the vehicle apparatus along a first segment to one of two or more possible subsequent second segments and (b) comprising an indication of at least one parameter characterizing travel of the vehicle apparatus along the first segment;
group the plurality of sequences of probe data into two or more groups of sequences of probe data based on a respective subsequent segment of the two or more possible subsequent segments corresponding to the respective sequence of probe data of the plurality of sequences of probe data, each group corresponding to one of the two or more possible subsequent second segments, wherein the respective subsequent segment of the two or more possible subsequent segments corresponding to the respective sequence of probe data is the respective subsequent segment that the respective vehicle apparatus traveled after traveling the first segment;
for the first group of the two or more groups, determine at least one representative parameter corresponding to the first segment based on the at least one parameter of the one or more sequences of the first group; and
modify at least one element of a data structure with the at least one representative parameter, the at least one element of the data structure corresponding to at least a portion of the first segment that corresponds to a maneuver from the first segment to the first subsequent segment, wherein (a) a geographic database comprises the data structure and (b) a navigation application is configured to use at least a portion of the geographic database that comprises the data structure to perform a navigation function.

* * * * *